US012590815B2

(12) United States Patent
Ohhashi

(10) Patent No.: US 12,590,815 B2
(45) Date of Patent: Mar. 31, 2026

(54) VSLAM WITH IMAGE BUFFER AND EXTRACTION

(71) Applicant: Socionext Inc., Kanagawa (JP)

(72) Inventor: Kazuyuki Ohhashi, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 39 days.

(21) Appl. No.: 18/656,055

(22) Filed: May 6, 2024

(65) Prior Publication Data

US 2024/0288281 A1 Aug. 29, 2024

Related U.S. Application Data

(63) Continuation of application No. PCT/JP2021/041428, filed on Nov. 10, 2021.

(51) Int. Cl.
| | |
|---|---|
| *G01C 21/00* | (2006.01) |
| *G06T 1/60* | (2006.01) |
| *G06T 7/73* | (2017.01) |
| *G06V 10/40* | (2022.01) |
| *G06V 20/58* | (2022.01) |

(52) U.S. Cl.
CPC ............ *G01C 21/3837* (2020.08); *G06T 1/60* (2013.01); *G06T 7/73* (2017.01); *G06V 10/40* (2022.01); *G06V 20/58* (2022.01)

(58) Field of Classification Search
CPC ......... G01C 21/3837; G06T 7/73; G06T 1/60; G06V 20/58; G06V 10/40
USPC .......................................................... 701/9
See application file for complete search history.

(56) References Cited

U.S. PATENT DOCUMENTS

| | | | |
|---|---|---|---|
| 10,268,201 B2 * | 4/2019 | Iwama | G06V 20/58 |
| 2016/0205889 A1 | 7/2016 | Bin | |
| 2017/0206666 A1 | 7/2017 | Homma et al. | |
| 2019/0043204 A1 * | 2/2019 | Mandal | G06F 18/22 |
| 2020/0230820 A1 | 7/2020 | Watanabe et al. | |
| 2021/0107465 A1 | 4/2021 | Hiei | |
| 2021/0270633 A1 | 9/2021 | Tomono | |
| 2022/0222851 A1 | 7/2022 | Yamaguchi et al. | |
| 2022/0277480 A1 | 9/2022 | Tokuhiro et al. | |
| 2023/0245471 A1 | 8/2023 | Hiei | |

FOREIGN PATENT DOCUMENTS

| | | |
|---|---|---|
| JP | 2016-045874 A | 4/2016 |
| JP | 2016-123021 A | 7/2016 |
| JP | 2018-205949 A | 12/2018 |
| JP | 2020-153956 A | 9/2020 |
| JP | 2021-062684 A | 4/2021 |

(Continued)

OTHER PUBLICATIONS

Machine translation of JP2020153956A specification (Year: 2020).*

(Continued)

*Primary Examiner* — Kenneth M Dunne
(74) *Attorney, Agent, or Firm* — Rimon P.C.

(57) ABSTRACT

According to one embodiment, an information processing device includes a buffer and a VSLAM processor. The buffer buffers image data of surroundings of a moving body obtained by an imaging unit of the moving body, and transmits extracted image data extracted based on extracted image determination information from among the buffered image data. The VSLAM processor executes a VSLAM process by using the extracted image data.

10 Claims, 16 Drawing Sheets

(56) References Cited

FOREIGN PATENT DOCUMENTS

| | | | |
|---|---|---|---|
| JP | 2021-082181 | A | 5/2021 |
| WO | 2019/073795 | A1 | 4/2019 |
| WO | 2020/026294 | A1 | 2/2020 |
| WO | 2020/246261 | A1 | 12/2020 |

OTHER PUBLICATIONS

International Search Report dated Dec. 21, 2021 issued in International Patent Application No. PCT/JP2021/041428, with English translation.
Written Opinion of the International Searching Authority dated Dec. 21, 2021 issued in International Patent Application No. PCT/JP2021/041428, with English translation.
Fu-Sheng Huang et al., "Vision SLAM Using Omni-Directional Visual Scan Matching", 2008 IEEE/RSJ International Conference on Intelligent Robots and Systems, Sep. 22-26, 2008, pp. 1588-1593.

* cited by examiner

FIG.17

VSLAM WITH IMAGE BUFFER AND EXTRACTION

CROSS-REFERENCE TO RELATED APPLICATIONS

This application is a continuation of International Application No. PCT/JP2021/041428, filed on Nov. 10, 2021, the entire contents of which are incorporated herein by reference.

FIELD

Embodiments described herein relate generally to an information processing device, an information processing method, and a computer program product.

BACKGROUND

There is a technique called simultaneous localization and mapping (SLAM) of acquiring a three-dimensional object around a moving body such as a vehicle as point cloud information and estimating self-position information and position information of the surrounding three-dimensional object. In addition, there is a technology called visual simultaneous localization and mapping (referred to as VSLAM) of performing SLAM by using images captured by a camera. For example, conventional technologies are described in patent documents, which are JP 2021-062684 A, JP 2021-082181 A, WO 2020/246261 A, JP 2018-205949 A, JP 2016-045874 A, JP 2016-123021 A, WO 2019/073795 A, and WO 2020/246261 A, and in a non-patent document, which is "Vision SLAM Using Omni-Directional Visual Scan Matching" 2008 IEEE/RSJ International Conference on Intelligent Robots and Systems, Sep. 22-26, 2008.

However, in the VSLAM process, for example, the position information of the surrounding objects obtained in the VSLAM process may be insufficient. As a result, detection of the position of the surrounding object and the self-position by the VSLAM may become unstable.

SUMMARY

An information processing device according to the present disclosure includes a buffer configured to buffer image data of surroundings of a moving body obtained by an imaging unit of the moving body, and transmit extracted image data extracted based on extracted image determination information from among the buffered image data; and a VSLAM processor configured to execute a VSLAM process by using the extracted image data.

BRIEF DESCRIPTION OF THE DRAWINGS

FIG. 17 is a schematic diagram illustrating an example of a functional configuration of the determination module.

DETAILED DESCRIPTION

Hereinafter, embodiments of an information processing device, an information processing method, and a computer program product disclosed in the present application will be described in detail with reference to the accompanying drawings. Note that the following embodiments do not limit the disclosed technology. Each embodiment can be appropriately combined within a range in which the processing contents do not contradict each other.

Figure 1:
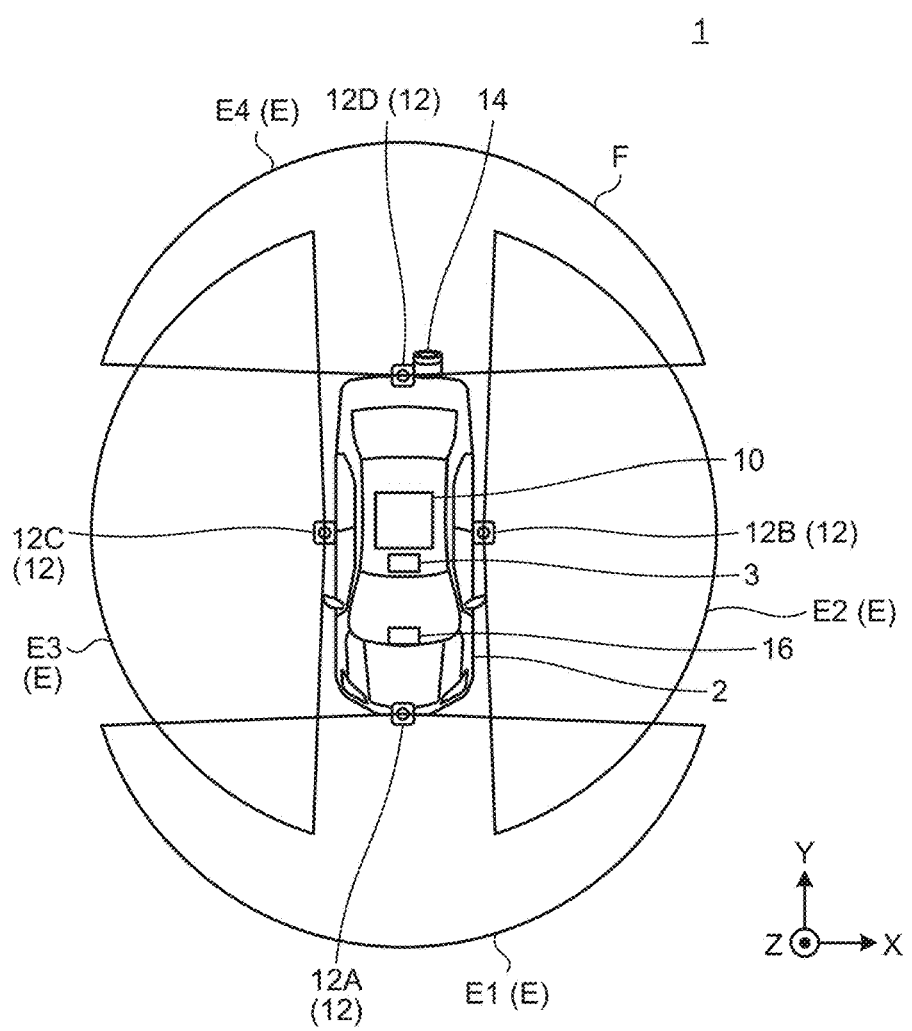
FIG. 1 is a diagram illustrating an example of an overall configuration of an information processing system according to an embodiment.

FIG. 1 is a diagram illustrating an example of an overall configuration of an information processing system 1 according to an embodiment. The information processing system 1 includes an information processing device 10, an imaging unit 12, a detection unit 14, and a display unit 16. The information processing device 10, the imaging unit 12, the detection unit 14, and the display unit 16 are connected so as to be able to send and receive data or signals.

In the present embodiment, a description will be given, as an example, of a case in which the information processing device 10, the imaging unit 12, the detection unit 14, and the display unit 16 are mounted on a moving body 2.

The moving body 2 is a movable object. The moving body 2 is, for example, a vehicle, a flying object (manned airplane, unmanned airplane (for example, an unmanned aerial vehicle (UAV) and a drone)), a robot, or the like. In addition, the moving body 2 is, for example, a moving body that travels through a driving operation by a person or a moving body that can automatically travel (autonomously travel) without through a driving operation by a person. In the present embodiment, a case where the moving body 2 is a vehicle will be described as an example. Examples of the vehicle include a two-wheeled automobile, a three-wheeled automobile, and a four-wheeled automobile. In the present embodiment, a case where the vehicle is an autonomously traveling four-wheeled vehicle will be described as an example.

In addition, the present embodiment is not limited to the case where all of the information processing device 10, the imaging unit 12, the detection unit 14, and the display unit 16 are mounted on a moving body 2. The information processing device 10 may be mounted on a stationary object. The stationary object is an object fixed to the ground. The stationary object is an immovable object or an object in a stationary state with respect to the ground. The stationary object is, for example, a traffic light, a parked vehicle, a road sign, or the like. Furthermore, the information processing device 10 may be mounted on a cloud server that executes processing on the cloud.

The imaging unit 12 images the surroundings of the moving body 2 and acquires captured image data. Hereinafter, the captured image data will be simply referred to as a captured image. The imaging unit 12 is, for example, a digital camera capable of imaging a moving image. Note that imaging refers to converting an image of a subject formed by an optical system such as a lens into an electric signal. The imaging unit 12 outputs the captured image to the information processing device 10. Furthermore, in the present embodiment, a description will be given on the assumption that the imaging unit 12 is a monocular fisheye camera (for example, the viewing angle is 195 degrees).

In the present embodiment, a case in which four imaging units 12 of a front imaging unit 12A, a left imaging unit 12B, a right imaging unit 12C, and a rear imaging unit 12D are mounted on the moving body 2 will be described as an example. The plurality of imaging units 12 (the front imaging unit 12A, the left imaging unit 12B, the right imaging unit 12C, and the rear imaging unit 12D) images a subject in imaging regions E in different directions (a front imaging region E1, a left imaging region E2, a right imaging region E3, and a rear imaging region E4) to acquire captured images. That is, it is assumed that the plurality of imaging units 12 has different imaging directions. In addition, it is assumed that the imaging directions of the plurality of imaging units 12 are adjusted in advance such that at least a part of the imaging regions E overlaps with the adjacent imaging units 12. Furthermore, in FIG. 1, the imaging regions E are illustrated in the size illustrated in FIG. 1 for convenience of description, but actually include a region further away from the moving body 2.

The four of the front imaging unit 12A, the left imaging unit 12B, the right imaging unit 12C, and the rear imaging unit 12D are examples, and the number of the imaging units 12 is not limited. For example, in a case where the moving body 2 has a vertically long shape like a bus or a truck, it is also possible to dispose one imaging unit 12 for each in the front, the rear, the front of the right side surface, the rear of the right side surface, the front of the left side surface, and the rear of the left side surface of the moving body 2, using six imaging units 12 in total. That is, the number and arrangement positions of the imaging units 12 can be arbitrarily set according to the size and shape of the moving body 2.

The detection unit 14 detects position information of each of a plurality of detection points in the surroundings of the moving body 2. In other words, the detection unit 14 detects the position information of each of the detection points in a detection region F. The detection point indicates each of points individually observed by the detection unit 14 in a real space. The detection point corresponds to, for example, a three-dimensional object in the surroundings of the moving body 2.

The position information of the detection point is information indicating the position of the detection point in the real space (three-dimensional space). For example, the position information of the detection point is information indicating the distance from the detection unit 14 (that is, the position of the moving body 2) to the detection point and the direction of the detection point with reference to the detection unit 14. The distance and direction can be expressed by, for example, position coordinates indicating a relative position of the detection point with reference to the detection unit 14, position coordinates indicating an absolute position of the detection point, a vector, or the like.

The detection unit 14 is, for example, a three-dimensional (3D) scanner, a two dimensional (2D) scanner, a distance sensor (millimeter wave radar and laser sensor), a sonar sensor that detects an object by sound waves, an ultrasonic sensor, or the like. The laser sensor is, for example, a three-dimensional laser imaging detection and ranging (LiDAR) sensor. Furthermore, the detection unit 14 may be a device using a technology of measuring a distance from an image captured by a stereo camera or a monocular camera, for example, a structure from motion (SfM) technology. Furthermore, the plurality of imaging units 12 may be used as the detection unit 14. Furthermore, one of the plurality of imaging units 12 may be used as the detection unit 14.

The display unit 16 displays various types of information. The display unit 16 is, for example, a liquid crystal display (LCD), an organic electro-luminescence (EL) display, or the like.

In the present embodiment, the information processing device 10 is communicably connected to an electronic control unit (ECU) 3 mounted on the moving body 2. The ECU 3 is a unit that performs electronic control of the moving body 2. In the present embodiment, it is assumed that the information processing device 10 can receive controller area network (CAN) data such as a speed and a moving direction of the moving body 2 from the ECU 3.

Next, a hardware configuration of the information processing device 10 will be described.

Figure 2:
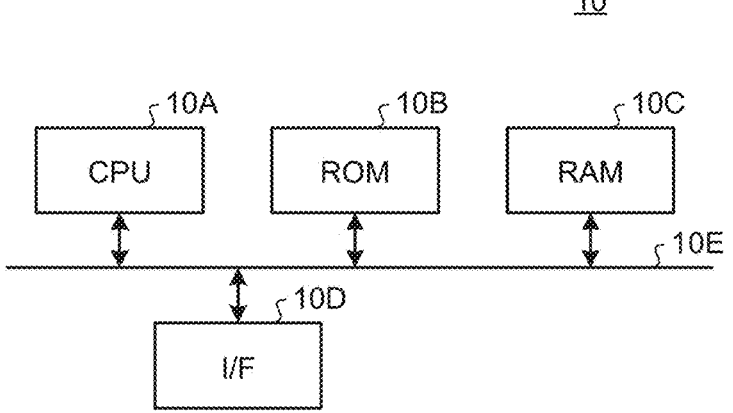
FIG. 2 is a diagram illustrating an example of a hardware configuration of an information processing device according to the embodiment.

FIG. 2 is a diagram illustrating an example of a hardware configuration of the information processing device 10.

The information processing device 10 includes a central processing unit (CPU) 10A, a read only memory (ROM) 10B, a random access memory (RAM) 10C, and an interface (I/F) 10D, and is, for example, a computer. The CPU 10A, the ROM 10B, the RAM 10C, and the I/F 10D are mutually connected by a bus 10E, and have a hardware configuration using a normal computer.

The CPU 10A is an arithmetic device that controls the information processing device 10. The CPU 10A corresponds to an example of a hardware processor. The ROM 10B stores programs and the like for realizing various processes by the CPU 10A. The RAM 10C stores data necessary for the various processes by the CPU 10A. The I/F 10D is an interface for connecting to the imaging unit 12, the detection unit 14, the display unit 16, the ECU 3, and the like to transmit and receive data.

A program for executing information processing executed by the information processing device 10 of the present embodiment is provided by being incorporated in the ROM 10B or the like in advance. Note that the program executed by the information processing device 10 according to the present embodiment may be provided by being recorded in a recording medium as a file in a format that can be installed or executed in the information processing device 10. The recording medium is a computer-readable medium. The recording medium is a compact disc (CD)-ROM, a flexible disk (FD), a CD-Recordable (CD-R), a digital versatile disk (DVD), a universal serial bus (USB) memory, a secure digital (SD) card, or the like.

Next, a functional configuration of the information processing device 10 according to the present embodiment will be described. The information processing device 10 simultaneously estimates, by the visual SLAM process, the position information of the detection point and the self-position information of the moving body 2 from the captured image captured by the imaging unit 12. The information processing device 10 connects a plurality of spatially adjacent captured images to generate a combined image overlooking the surroundings of the moving body 2, and displays the combined image. In the present embodiment, the imaging unit 12 is used as the detection unit 14.

Figure 3:
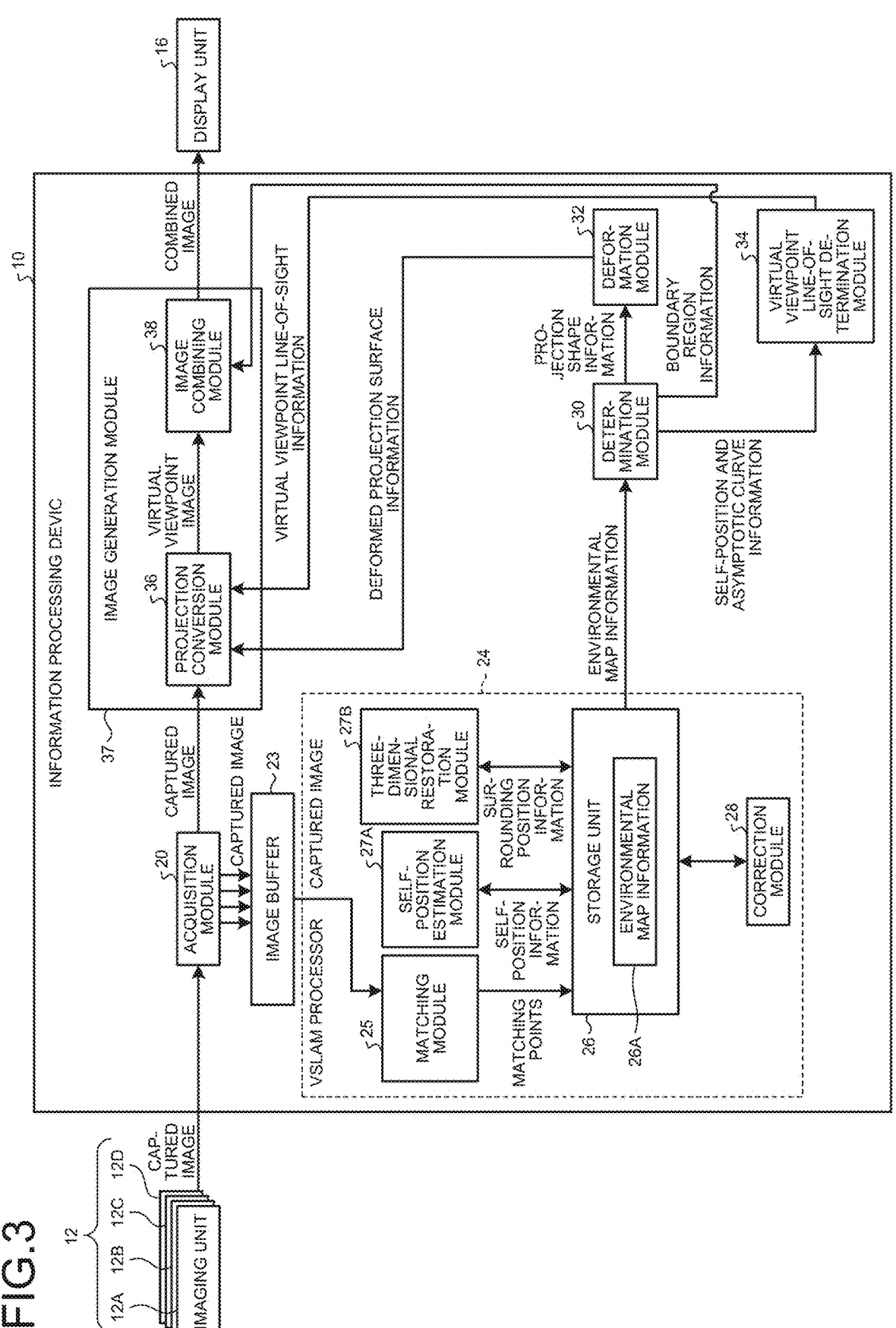
FIG. 3 is a diagram illustrating an example of a functional configuration of the information processing device according to the embodiment.

FIG. 3 is a diagram illustrating an example of a functional configuration of the information processing device 10. Note that, in order to clarify the data input/output relationship, FIG. 3 illustrates the imaging unit 12 and the display unit 16 in addition to the information processing device 10.

The information processing device 10 includes an acquisition module 20, an image buffer 23, a VSLAM processor 24, a determination module 30, a deformation module 32, a virtual viewpoint line-of-sight determination module 34, a projection conversion module 36, and an image combining module 38.

Some or all of the plurality of components described above may be realized, for example, by causing a processing device such as the CPU 10A to execute a program, that is, by software. In addition, some or all of the plurality of units described above may be realized by hardware such as an integrated circuit (IC), or may be realized by using software and hardware in combination.

The acquisition module 20 acquires a captured image from the imaging unit 12. That is, the acquisition module 20 acquires the captured image from each of the front imaging unit 12A, the left imaging unit 12B, the right imaging unit 12C, and the rear imaging unit 12D.

Every time a captured image is acquired, the acquisition module 20 outputs the acquired captured image to the projection conversion module 36 and the image buffer 23.

The image buffer 23 buffers the captured image sent from the imaging unit 12, and transmits the captured image to the VSLAM processor 24 after a thinning process. In addition, the image buffer 23 buffers image data of the surroundings of the moving body 2 obtained by imaging by the imaging unit 12 of the moving body 2 in a buffering VSLAM process to be described later, and transmits extracted image data among the buffered image data. Here, the extracted image data is image data extracted for a predetermined imaging period, a thinning interval, an imaging direction, and a region in the image from the buffered image based on extracted image determination information. Furthermore, the extracted image determination information includes, for example, information determined on the basis of at least one of information on the state of movement of the moving body 2, instruction information by a passenger of the moving body 2, information on the surrounding object of the moving body 2 identified by a surrounding object detection sensor mounted on the moving body 2, and information on the surroundings of the moving body 2 recognized on the basis of image data obtained by the imaging unit 12.

Figure 4:
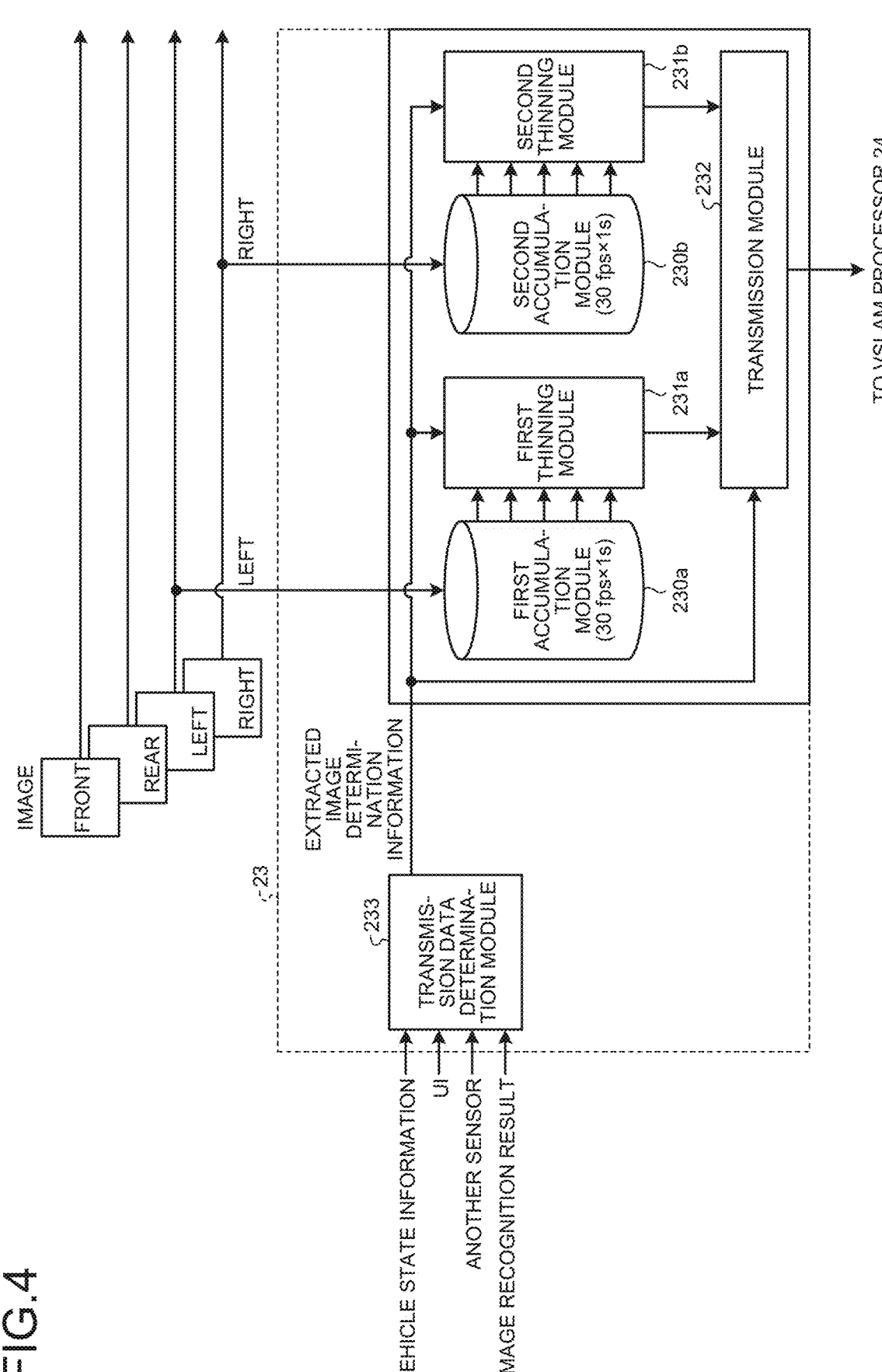
FIG. 4 is a diagram illustrating an example of a configuration of an image buffer.

FIG. 4 is a diagram illustrating an example of a configuration of the image buffer 23. As illustrated in FIG. 4, the image buffer 23 includes a first accumulation module 230a, a first thinning module 231a, a second accumulation module 230b, a second thinning module 231b, a transmission module 232, and a transmission data determination module 233. Note that, in the present embodiment, for the sake of concrete explanation, a case where an image is sent from each of the left imaging unit 12B and the right imaging unit 12C to the image buffer 23 via the acquisition module 20 at a frame rate of 30 fps is taken as an example.

Note that vehicle state information included in CAN data received from the ECU 3, instruction information by a passenger of the moving body, information identified by a surrounding object detection sensor mounted on the moving body, information in which a specific image is recognized, and the like are input to the transmission data determination module 233. Here, the vehicle state information is information including, for example, a traveling direction of the moving body 2, a state of a direction instruction of the moving body 2, a state of a gear of the moving body 2, and the like. The instruction information by the passenger of the moving body assumes, for example, a case of selecting the type of parking to be performed, such as perpendicular parking or parallel parking in the automatic parking mode, and the instruction information is input by an operation instruction of a user.

The transmission data determination module 233 generates the extracted image determination information on the basis of the vehicle state information, the instruction information by a passenger of the moving body 2, the information identified by the surrounding object detection sensor mounted on the moving body 2, the information in which a specific image is recognized, and the like. The extracted image determination information includes, for example, information such as an imaging period, a thinning interval, an imaging direction, and a specific region in an image of image data to be subjected to the VSLAM process. The specific region in the image can be derived by a point of interest (POI) technology or the like. The extracted image determination information is output to the first thinning module 231a, the second thinning module 231b, and the transmission module 232.

The first accumulation module 230a receives an input of an image captured by the left imaging unit 12B and sent at a frame rate of, for example, 30 fps, and accumulates the image for, for example, one second (that is, 30 frames in the case of 30 fps). In addition, the first accumulation module 230a updates the images to be accumulated at a predetermined cycle.

The first thinning module 231a thins and reads images for a plurality of frames accumulated in the first accumulation module 230a. The first thinning module 231a controls a rate (thinning interval) at the time of thinning the image on the basis of the extracted image determination information. In addition, the first thinning module 231a temporarily stores the image read from the first accumulation module 230a.

The second accumulation module 230b receives an input of an image captured by the right imaging unit 12C and sent at a frame rate of, for example, 30 fps, and accumulates the image for, for example, one second (that is, 30 frames in the case of 30 fps). In addition, the first accumulation module 230a updates the images to be accumulated at a predetermined cycle.

The second thinning module 231b thins and reads images for a plurality of frames accumulated in the second accumulation module 230b. The second thinning module 231b controls a rate (thinning interval) at the time of thinning the image on the basis of the extracted image determination information. In addition, the second thinning module 231b temporarily stores the image read from the second accumulation module 230b.

The transmission module 232 determines an imaging direction (also referred to as a "target direction") used for buffering VSLAM process to be described later on the basis of the extracted image determination information. The transmission module 232 reads images corresponding to the determined target direction from the first thinning module 231a and the second thinning module 231b one by one in chronological order, and sequentially transmits the images to the VSLAM processor 24.

Returning to FIG. 3, the VSLAM processor 24 executes the VSLAM process using the captured image transmitted from the image buffer 23. That is, the VSLAM processor 24 receives the captured image from the image buffer 23, executes the VSLAM process using the captured image to generate the environmental map information, and outputs the generated environmental map information to the determination module 30.

More specifically, the VSLAM processor 24 includes a matching module 25, a storage unit 26, a self-position estimation module 27A, a three-dimensional restoration module 27B, and a correction module 28.

The matching module 25 performs a feature amount extraction process and a matching process between images on a plurality of captured images captured at different imaging timings (a plurality of captured images having different frames). Specifically, the matching module 25 performs a feature amount extraction process from the plurality of captured images. The matching module 25 performs, for a plurality of captured images captured at different imaging timings, a matching process of specifying a corresponding point between the plurality of captured images by using a feature amount between the plurality of captured images. The matching module 25 outputs a result of the matching process to the storage unit 26.

The self-position estimation module 27A estimates a relative self-position with respect to the captured image by projective transformation or the like using the plurality of matching points acquired by the matching module 25. Here, the self-position includes information of the position (three-dimensional coordinates) and inclination (rotation) of the imaging unit 12. A self-position estimation module 27 stores the self-position information as point cloud information in an environmental map information 26A.

The three-dimensional restoration module 27B performs the perspective projection transformation processing using a moving amount (a translation amount and a rotation amount) of the self-position estimated by the self-position estimation module 27A, and determines the three-dimensional coordinates (relative coordinates with respect to the self-position) of the matching points. The three-dimensional restoration module 27B stores surrounding position information, which is the determined three-dimensional coordinates, as point cloud information in the environmental map information 26A.

As a result, new surrounding position information and new self-position information are sequentially added to the environmental map information 26A as the moving body 2 on which the imaging unit 12 is mounted moves.

The storage unit 26 stores various data. The storage unit 26 is, for example, a semiconductor memory element such as a RAM or a flash memory, a hard disk, an optical disk, or the like. Note that the storage unit 26 may be a storage device externally provided to the information processing device 10. Furthermore, the storage unit 26 may be a storage medium. Specifically, the storage medium may store or temporarily store a program or various types of information downloaded via a local area network (LAN), the Internet, or the like.

The environmental map information 26A is information in which point cloud information that is the surrounding position information calculated by the three-dimensional restoration module 27B and point cloud information that is the self-position information calculated by the self-position estimation module 27A are registered in a three-dimensional coordinate space with a predetermined position in the real space as an origin (reference position). The predetermined position in the real space may be determined on the basis of, for example, a preset condition.

For example, the predetermined position is a position of the moving body 2 when the information processing device 10 executes information processing of the present embodiment. For example, it is assumed that information processing is executed at a predetermined timing such as a parking scene of the moving body 2. In this case, the information processing device 10 may set the position of the moving body 2 at the time it is determined that the predetermined timing has been reached as the predetermined position. For example, when it is determined that the behavior of the moving body 2 has become the behavior indicating a parking scene, the information processing device 10 may determine that the predetermined timing has been reached. The behavior indicating the parking scene caused by the backward movement is, for example, a case where the speed of the moving body 2 becomes equal to or less than a predetermined speed, a case where the gear of the moving body 2 is put in back gear, a case where a signal indicating the start of parking is received by an operation instruction of the user, or the like. In addition, the predetermined timing is not limited to the parking scene.

Figure 5:
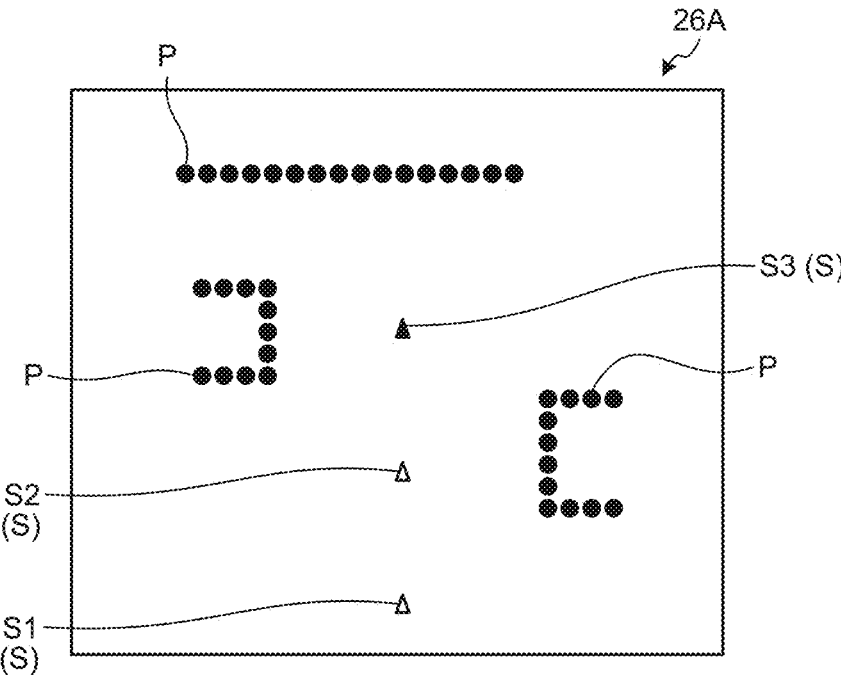
FIG. 5 is a schematic diagram illustrating an example of environmental map information according to the embodiment.

FIG. 5 is a schematic diagram of an example of the environmental map information 26A. As illustrated in FIG. 5, the environmental map information 26A is information in which point cloud information that is position information (surrounding position information) of each of detection points P and point cloud information that is self-position information of self-position S of the moving body 2 are registered at corresponding coordinate positions in the three-dimensional coordinate space. Note that FIG. 5 illustrates the self-position S of the self-position S1 to the self-position S3 as an example. As the value of the numerical value following S is larger, it means that the self-position S is closer to the current timing.

The correction module 28 corrects the surrounding position information and the self-position information registered in the environmental map information 26A using, for example, the least squares method or the like so that the sum of the differences in distance in the three-dimensional space is minimized between the three-dimensional coordinates calculated in the past and the newly calculated three-dimensional coordinates for a point matched a plurality of times between a plurality of frames. Note that the correction module 28 may correct the movement amount (translation amount and rotation amount) of the self-position used in the process of calculating the self-position information and the surrounding position information.

The timing of the correction process by the correction module 28 is not limited. For example, the correction module 28 may execute the correction process described above at predetermined timings. The predetermined timings may be determined on the basis of, for example, a preset condition. Note that, in the present embodiment, a case where the information processing device 10 includes the correction module 28 will be described as an example. However, the information processing device 10 may be configured not to include the correction module 28.

Buffering VSLAM Process

Here, the buffering VSLAM process implemented by the image buffer 23 and the VSLAM processor 24 will be described with reference to FIGS. 6 to 13. The buffering VSLAM process buffers image data of the surroundings of the moving body 2 obtained by imaging by the imaging unit 12 of the moving body 2, and executes the VSLAM process using the extracted image data among the buffered image data.

Note that, in the following, for the sake of concrete explanation, an example of using the buffering VSLAM process in a case where the moving body 2 parks in reverse will be described.

Figure 6:
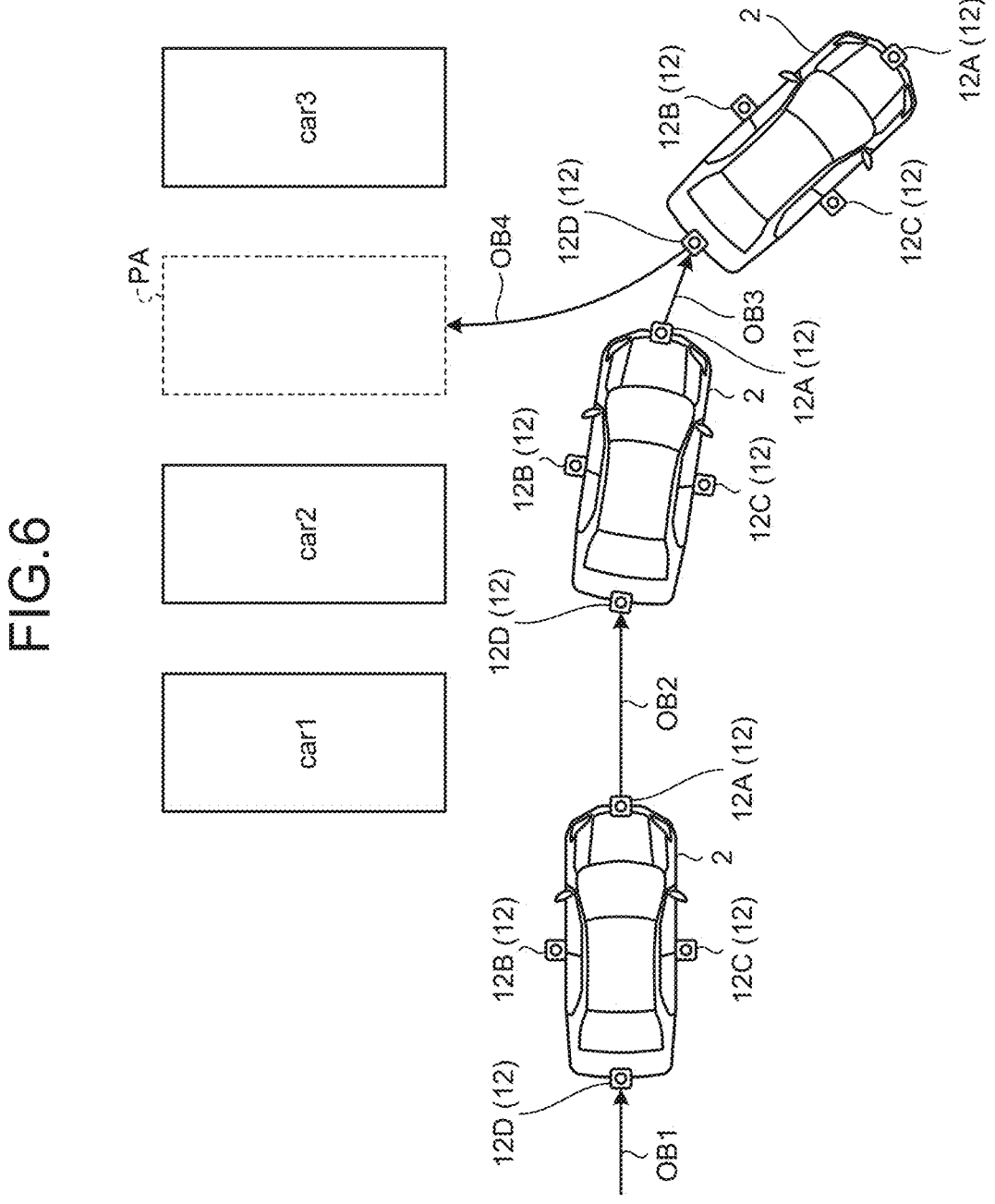
FIG. 6 is a plan view illustrating a track in a case where a moving body moves forward, temporarily stops, and then moves backward to park in reverse in the parking space.

FIG. 6 is a plan view illustrating tracks OB1 to OB4 in a case where the moving body 2 moves forward, temporarily stops, and then moves backward to park in reverse in the parking space PA. That is, in the example illustrated in FIG. 6, the moving body 2 travels while decelerating in a parking lot from the left side of the drawing toward the parking space PA (tracks OB1 and OB2). The moving body 2 turns rightward in the traveling direction by a predetermined angle or more to park in reverse in the parking space PA (track OB3), and then temporarily stops to switch the gear of moving body 2 from drive "D" to reverse "R". Then, the moving body 2 moves backward to be parked in reverse in the parking space PA (track OB4). Note that car1, car2, and car3 each indicate another moving body parked in a parking space different from the parking space PA.

Figure 7:
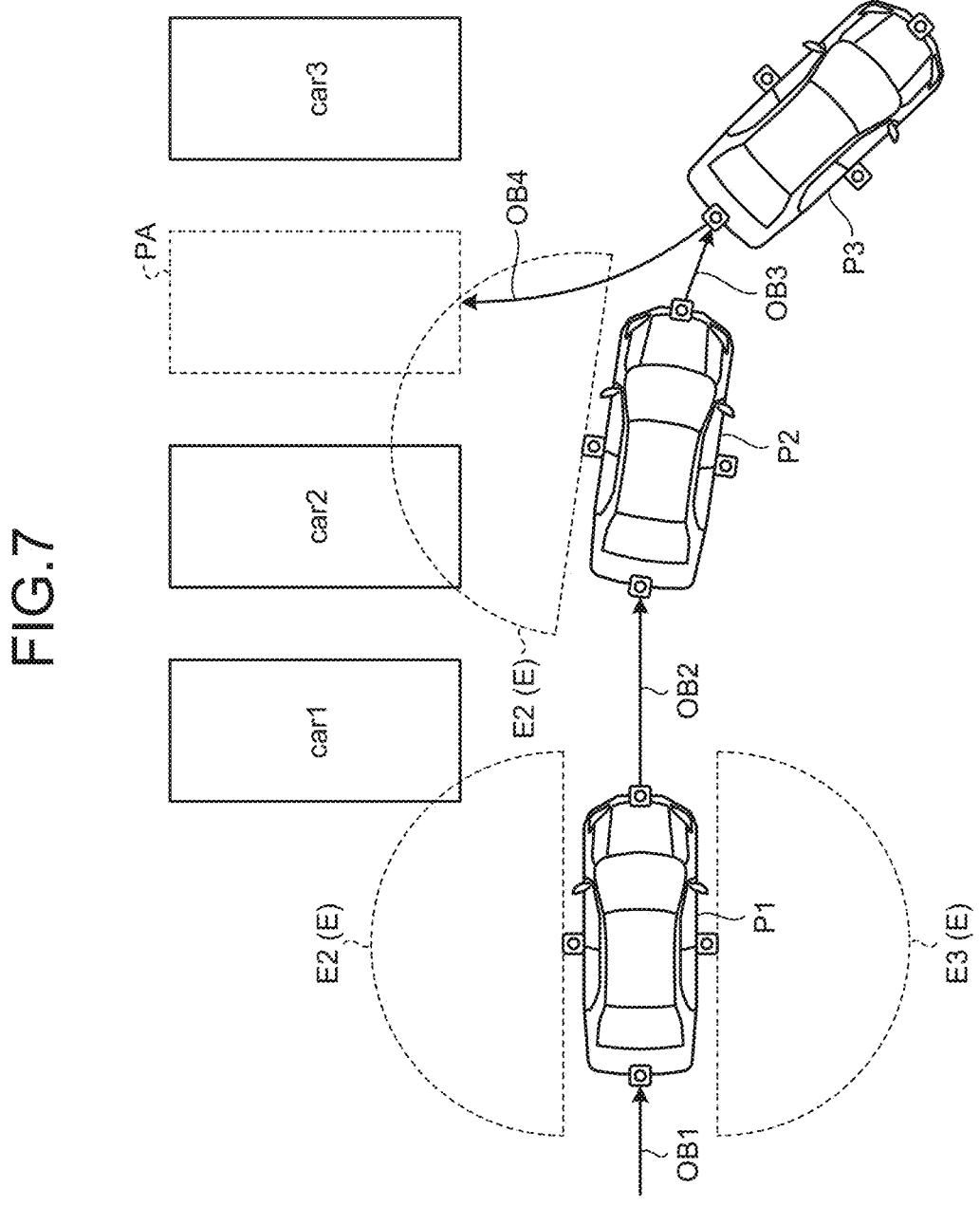
FIG. 7 is a diagram for explaining a timing to start a buffering VSLAM process in a case where the moving body moves along the track illustrated in FIG. 6.

FIG. 7 is a diagram for explaining a timing to start the buffering VSLAM process in a case where the moving body 2 moves along the tracks OB1 to OB4 illustrated in FIG. 6; That is, when the speed of the moving body 2 traveling in the parking lot at a position P1 becomes equal to or lower than the first predetermined speed, the first accumulation module 230*a* starts buffering the left captured image of the left imaging region E2 by the left imaging unit 12B. In addition, the second accumulation module 230*b* starts buffering the right captured image in the right imaging region E by the right imaging unit 12C. Thereafter, the first accumulation module 230*a* and the second accumulation module 230*b* continuously execute buffering of the captured image at a frame rate of 30 fps.

Note that the determination as to whether the speed of the moving body 2 has become equal to or lower than the first predetermined speed can be executed on the basis of the vehicle state information received by the image buffer 23.

Each of the first thinning module 231*a* and the second thinning module 231*b* executes a thinning process and outputs the captured image to the transmission module 232.

In FIG. 7, being triggered by a time when the moving body 2 turns rightward by a predetermined angle or more while further traveling (position P2), the transmission module 232 determines that the target direction is leftward on the basis of the extracted image determination information including the vehicle state information, and starts transmitting the left captured image obtained by capturing the left imaging region E2 to the VSLAM processor 24. In the present embodiment, the extracted image determination information serving as a trigger for the transmission module 232 to start sending the left captured image to the VSLAM processor 24 is also referred to as "trigger information". The generation timing of the trigger information is an example of a predetermined timing.

Note that the left captured image to be a target when the transmission module 232 starts transmission corresponds to an image acquired and buffered in a predetermined period going back from the generation timing of the trigger information.

The VSLAM processor 24 executes the VSLAM process using the left captured image transmitted from the transmission module 232. The VSLAM process using the left captured image is executed until the moving body 2 travels on the track OB3 while reducing the speed and then temporarily stops to switch the gear from the drive "D" to the reverse "R" (position P3).

After switching the gear from the drive "D" to the reverse "R", in a case where the moving body 2 moves backward along the track OB4 and is parked in reverse in the parking space PA, the VSLAM process at the frame rate of 3 fps using the rear captured image of the rear imaging region E4 by the rear imaging unit 12D is executed.

As described above, in a case where the captured image on which the VSLAM process is executed is changed, the point cloud information obtained by the respective VSLAM processes may be matched to generate the integrated point cloud information. For example, in the present embodiment, the point cloud information generated by the VSLAM process using the left captured image may be integrated into the point cloud information generated by the VSLAM process using the rear captured image. That is, the map information obtained by the VSLAM process based on the image data of the surroundings of the moving body before the change of the traveling direction of the moving body 2 and the map information obtained by the VSLAM process based on the image data of the surroundings of the moving body after the change of the traveling direction of the moving body 2 may be integrated.

Figure 8:
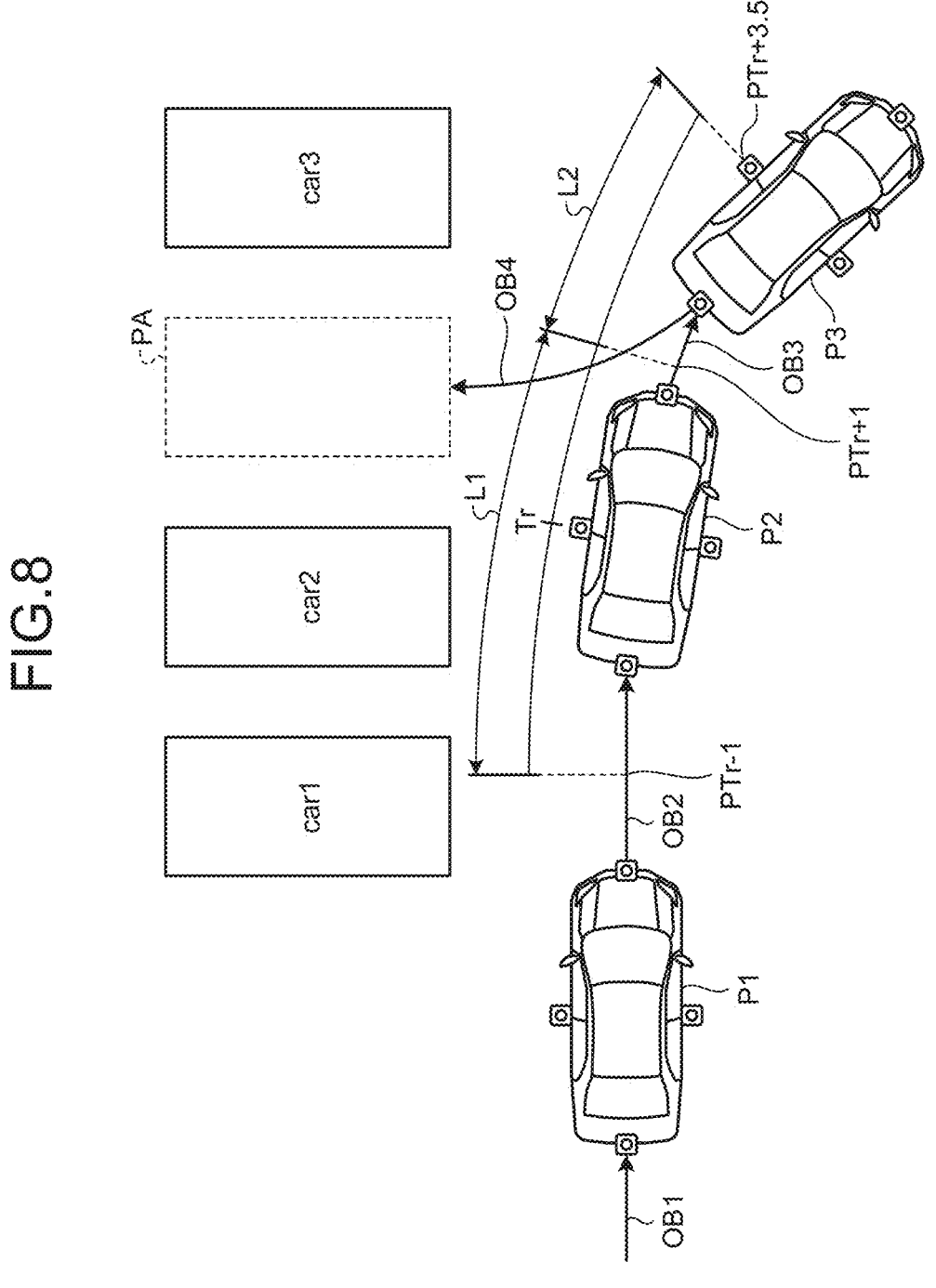
FIG. 8 is a diagram for explaining a spatial range to obtain a left captured image used for a buffering VSLAM process in a case where the moving body moves along the track illustrated in FIG. 6.

FIG. 8 is a diagram for explaining a spatial range to obtain the left captured image used for the buffering VSLAM process in a case where the moving body 2 moves along the tracks OB1 to OB4 illustrated in FIG. 6.

Note that, in FIG. 8, a position Tr indicates a position of the left imaging unit 12B at the timing when the trigger information is generated, a position PTr−1 indicates a position of the left imaging unit 12B at the timing one second before the generation of the trigger information, a position PTr+1 indicates a position of the left imaging unit 12B at the timing when one second has elapsed from the generation of the trigger information, and a position PTr+3.5 indicates a position of the left imaging unit 12B at a position where the moving body 2 is stopped (the timing when three and a half seconds have elapsed from the generation of the trigger information).

As illustrated in FIG. 8, at the timing when the trigger information is generated when the left imaging unit 12B is at the position Tr, left captured images of a plurality of frames acquired in a period one second before the generation of the trigger information are accumulated in the first accumulation module 230*a*. The left captured images of the plurality of frames correspond to images captured over the range from the position PTr−1 to the position Tr in FIG. 8. The transmission module 232 extracts the left captured image accumulated in the first accumulation module 230a to the first thinning module 231a in response to the generation of the trigger information (that is, at the timing when the left imaging unit 12B reaches the position Tr), and sequentially starts sending the left captured image in time series from the first thinning module 231a to the VSLAM processor 24 via the transmission module 232. Therefore, before the gear is switched from the drive "D" to the reverse "R", the VSLAM processor 24 can execute the VSLAM process for parking in reverse using the plurality of left captured images in which the cars 1 and 2 are captured.

In addition, in FIG. 8, it is assumed that the traveling speed of the moving body 2 becomes equal to or less than a predetermined threshold at a timing when one second has elapsed from the generation of the trigger information. In such a case, the first thinning module 231a changes the frame rate of the thinning process from 5 fps to 2 fps, for example. Therefore, the VSLAM process is executed in a section L1 from the position PTr−1 to the position PTr+1 using the left captured image transmitted at a frame rate of 5 fps, and in a section L2 from the position PTr+1 to the position PTr+3.5 using the left captured image sent at a frame rate of 2 fps.

Figure 9:
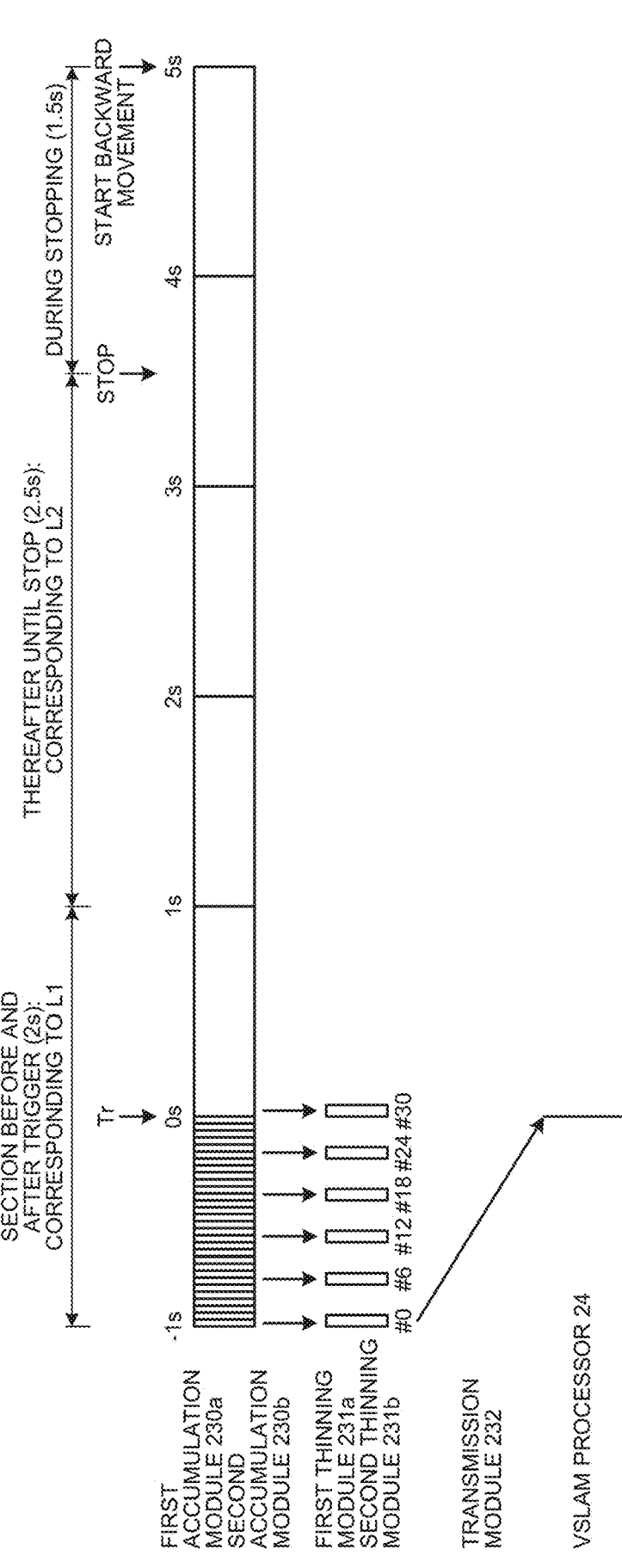
FIG. 9 is a diagram for explaining the buffering VSLAM process started at a trigger generation time.

FIG. 9 is a diagram for explaining the buffering VSLAM process started at a trigger generation time. In FIGS. 9 to 13, the trigger generation time is denoted as Tr, and the reference time is 0 s.

In response to the trigger generation, the first thinning module 231a reads, from the first accumulation module 230a at a predetermined cycle, left captured images of a plurality of frames thinned out so as to be equivalent to 5 fps. The first thinning module 231a outputs the left captured images of the plurality of frames read from the first accumulation module 230a to the transmission module 232.

Similarly, in response to the trigger generation, the second thinning module 231b reads, from the second accumulation module 230b at a predetermined cycle, right captured images of a plurality of frames thinned out so as to be equivalent to 5 fps. The second thinning module 231b outputs the right captured images of the plurality of frames read from the second accumulation module 230b to the transmission module 232.

The left captured image read by the first thinning module 231a and the right captured image read by the second thinning module 231b in this manner are captured images acquired in a period one second before the trigger generation time (an example of a first period) and accumulated in the first accumulation module 230a and the second accumulation module 230b. Note that FIG. 9 illustrates a case where the thinning rate is set to ⅙ and images of six frames #0, #6, #12, #18, #24, and #30 are read.

The transmission module 232 starts transmission of the left captured image (frame #0) corresponding to the determined imaging direction out of the left captured image acquired from the first thinning module 231a and the right captured image acquired from the second thinning module 231b to the VSLAM processor 24.

Figure 10:
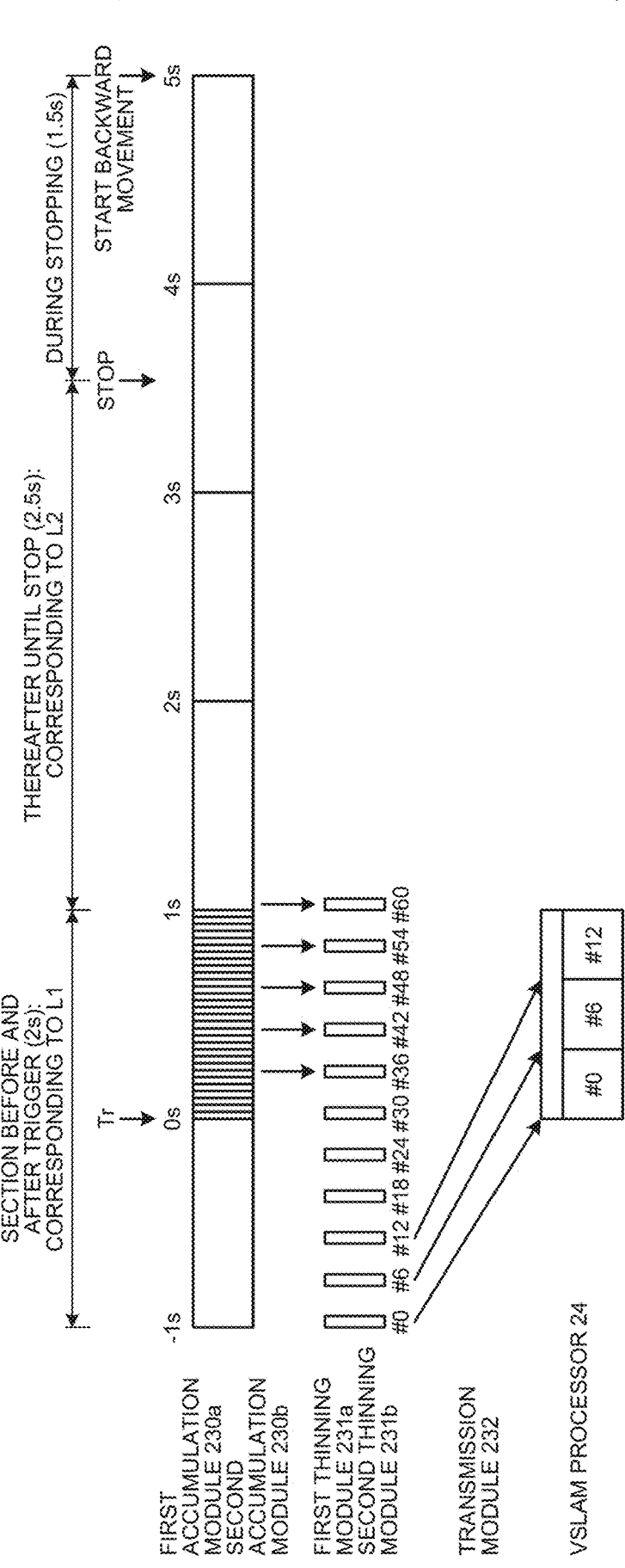
FIG. 10 is a diagram for explaining the buffering VSLAM process when one second has elapsed from a generation timing of trigger information illustrated in FIG. 9.

FIG. 10 is a diagram for explaining the buffering VSLAM process when one second has elapsed from a generation timing of trigger information illustrated in FIG. 9. That is, FIG. 10 illustrates that the VSLAM process is performed at a pace of 3 fps while the first thinning module 231a performs thinning so as to be equivalent to 5 fps in one second from the generation timing of the trigger information.

The first thinning module 231a reads, from the first accumulation module 230a at a predetermined cycle, left captured images (#36, #42, #48, #54, and #60) of a plurality of frames thinned out so as to be equivalent to 5 fps, and sends the left captured image to the transmission module 232.

Similarly, the second thinning module 231b reads, from the second accumulation module 230b at a predetermined cycle, right captured images (#36, #42, #48, #54, and #60) of a plurality of frames thinned out so as to be equivalent to 5 fps, and sends the right captured image to the transmission module 232.

The transmission module 232 sends the left captured images (#0, #6, and #12) corresponding to the determined target direction out of the left captured image acquired from the first thinning module 231a and the right captured image acquired from the second thinning module 231b to the VSLAM processor 24. The VSLAM processor 24 executes the VSLAM process using the left captured images (#0, #6, and #12) of a plurality of frames received from the transmission module 232.

Figure 11:
FIG. 11 is a diagram for explaining the buffering VSLAM process when one second has further elapsed from the time point one second elapsed from the generation timing of the trigger information illustrated in FIG. 10.

FIG. 11 is a diagram for explaining the buffering VSLAM process when one second has further elapsed accompanying with the forward movement of the moving body 2 from the time point one second elapsed from the generation timing of the trigger information illustrated in FIG. 10. In other words, FIG. 11 illustrates the buffering VSLAM process executed after one second has elapsed from the generation timing of the trigger information and then the thinning frame rate is changed from 5 fps to 2 fps in accordance with the deceleration of the moving body 2, and by a time point one second has elapsed (that is, time 2s).

The first thinning module 231a reads, from the first accumulation module 230a at a predetermined cycle, left captured images (#75 and #90) of a plurality of frames thinned out so as to be equivalent to 2 fps, and sends the left captured image to the transmission module 232.

Similarly, the second thinning module 231b reads, from the second accumulation module 230b at a predetermined cycle, right captured images (#75 and #90) of a plurality of frames thinned out so as to be equivalent to 2 fps, and sends the right captured image to the transmission module 232.

The transmission module 232 transmits the left captured images (#18, #24, and #30) corresponding to the determined target direction out of the left captured image acquired from the first thinning module 231a and the right captured image acquired from the second thinning module 231b to the VSLAM processor 24. The VSLAM processor 24 executes the VSLAM process using the left captured images (#18, #24, and #30) of a plurality of frames received from the transmission module 232.

Figure 12:
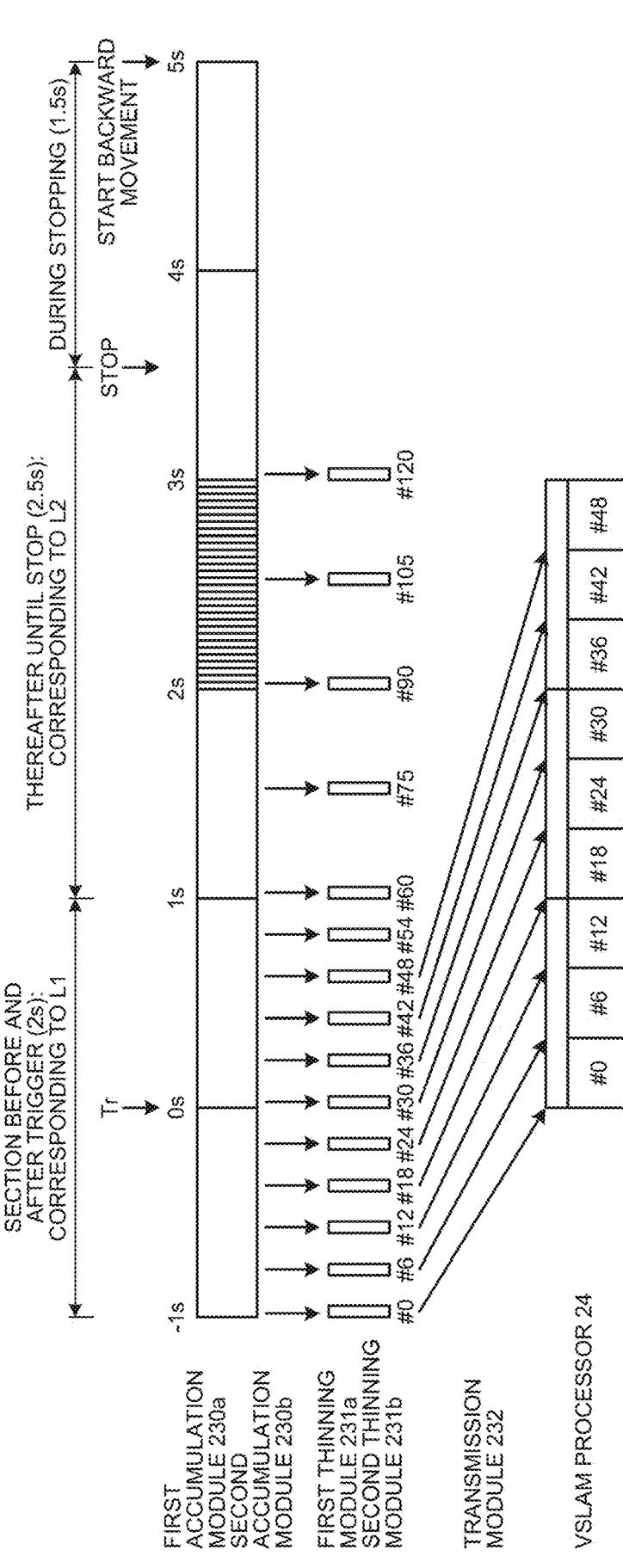
FIG. 12 is a diagram for explaining the buffering VSLAM process when one second has further elapsed from the time point two seconds elapsed from the generation timing of the trigger information illustrated in FIG. 11.

FIG. 12 is a diagram for explaining the buffering VSLAM process when one second has further elapsed from the time point two seconds elapsed from the generation timing of the trigger information illustrated in FIG. 11. In other words, FIG. 12 illustrates the buffering VSLAM process executed after one second has elapsed from the generation timing of the trigger information and then the thinning frame rate is changed from 5 fps to 2 fps, and by a time point two seconds have elapsed (that is, time 3s).

The first thinning module 231a reads, in one second from the time 2s to the time 3s, from the first accumulation module 230a at a predetermined cycle, left captured images (#105 and #120) of a plurality of frames thinned out so as to be equivalent to 2 fps, and sends the left captured image to the transmission module 232.

Similarly, the second thinning module 231b reads, in one second from the time 2s to the time 3s, from the second accumulation module 230b at a predetermined cycle, right captured images (#105 and #120) of a plurality of frames thinned out so as to be equivalent to 2 fps, and sends the right captured image to the transmission module 232.

The transmission module 232 transmits, in one second from a time point two seconds elapsed after the generation timing of the trigger information to a time point three seconds elapsed after the generation timing of the trigger information, the left captured images (#36, #42, and #48) corresponding to the determined target direction out of the left captured image acquired from the first thinning module 231a and the right captured image acquired from the second thinning module 231b to the VSLAM processor 24. The VSLAM processor 24 executes the VSLAM process using the left captured images (#36, #42, and #48) of a plurality of frames received from the transmission module 232.

Figure 13:
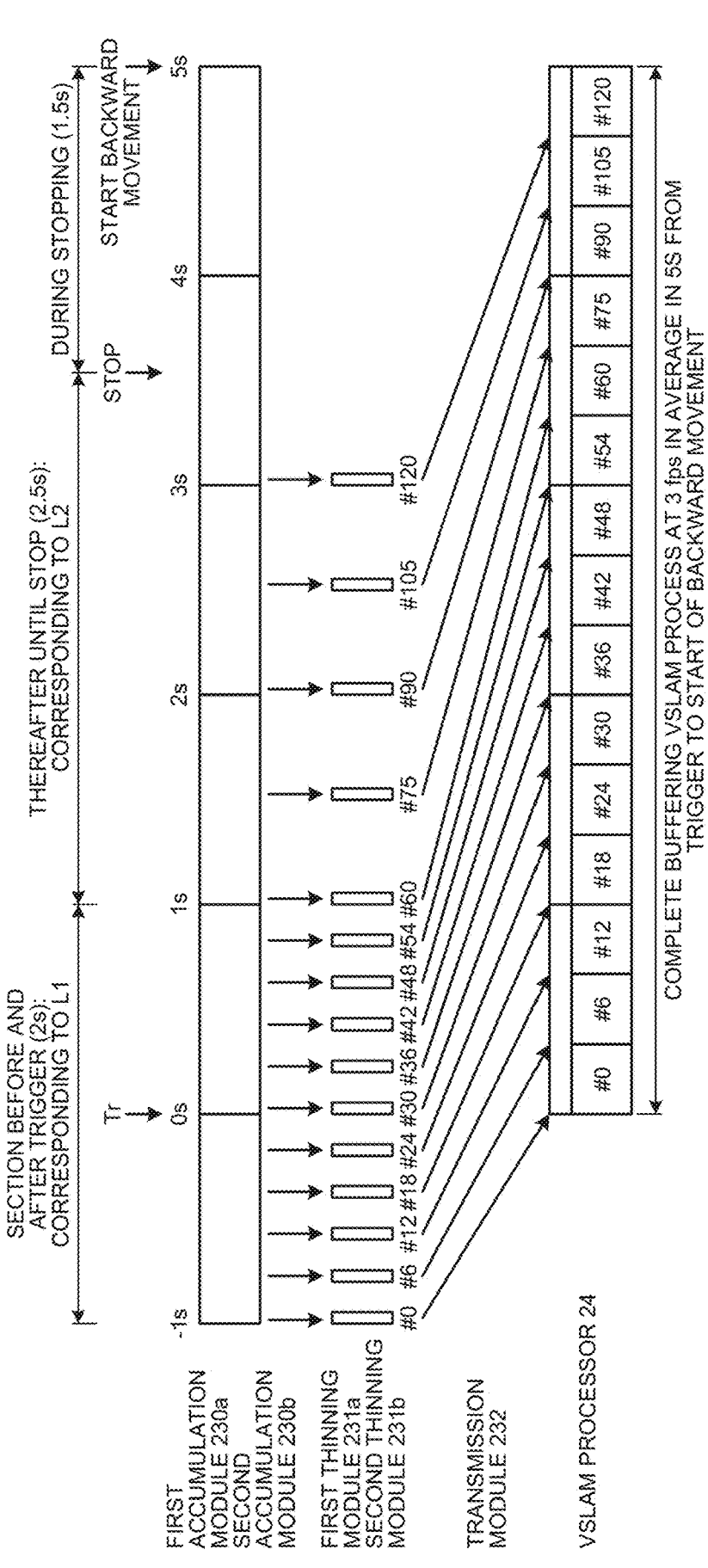
FIG. 13 is a diagram for explaining the buffering VSLAM process when two and a half seconds have further elapsed from the time point three seconds elapsed from the generation timing of the trigger information illustrated in FIG. 12.

FIG. 13 is a diagram for explaining the buffering VSLAM process when two seconds have further elapsed from the time point three seconds elapsed from the generation timing of the trigger information illustrated in FIG. 12. That is, FIG. 13 illustrates the buffering VSLAM process executed after three and a half seconds have elapsed from the generation timing of the trigger information, the moving body 2 stops, and then by the time one and a half seconds have elapsed and the backward movement is started. Note that a period until a time three and a half seconds elapse from the generation timing of the trigger information and then the moving body 2 stops is an example of a second period.

The transmission module 232 transmits, in two seconds between a time point three seconds elapsed after the generation timing of the trigger information and a time point five seconds elapsed until the time the backward movement starts, the left captured images (#54, #60, #75, #90, #105, and #120) corresponding to the determined target direction out of the left captured image acquired from the first thinning module 231a and the right captured image acquired from the second thinning module 231b to the VSLAM processor 24. The VSLAM processor 24 executes the VSLAM process using the left captured images (#54, #60, #75, #90, #105, and #120) of a plurality of frames received from the transmission module 232.

Therefore, the VSLAM processor 24 sets a period from a point of time earlier by the first period from the generation timing of the trigger information to the time point when the moving body 2 stops as a target period for acquiring the left captured image. In five-seconds from the generation timing of the trigger information to the start of the backward movement, to park in reverse in the parking space PA, the VSLAM processor 24 can complete the VSLAM process (that is, VSLAM process at 3 fps in average) using the left captured image of 15 frames by the time the backward movement starts.

Returning to FIG. 3, the determination module 30 receives the environmental map information from the VSLAM processor 24, and calculates the distance between the moving body 2 and the surrounding three-dimensional object using the surrounding position information and the self-position information accumulated in the environmental map information 26A.

Furthermore, the determination module 30 determines a projection shape of a projection surface using the distance between the moving body 2 and the surrounding three-dimensional object, and generates projection shape information. The determination module 30 outputs the generated projection shape information to the deformation module 32.

Here, the projection surface is a stereoscopic surface for projecting a surrounding image of the moving body 2. Further, the surrounding image of the moving body 2 is a captured image of the surroundings of the moving body 2, and is a captured image imaged by each of the imaging unit 12A to the imaging unit 12D. The projection shape of the projection surface is a three-dimensional (3D) shape virtually formed in a virtual space corresponding to the real space. In the present embodiment, the determination of the projection shape of the projection surface executed by the determination module 30 is referred to as a projection shape determination process.

In addition, the determination module 30 calculates an asymptotic curve of the surrounding position information with respect to the self-position by using the surrounding position information and the self-position information of the moving body 2 accumulated in the environmental map information 26A.

Figure 14:
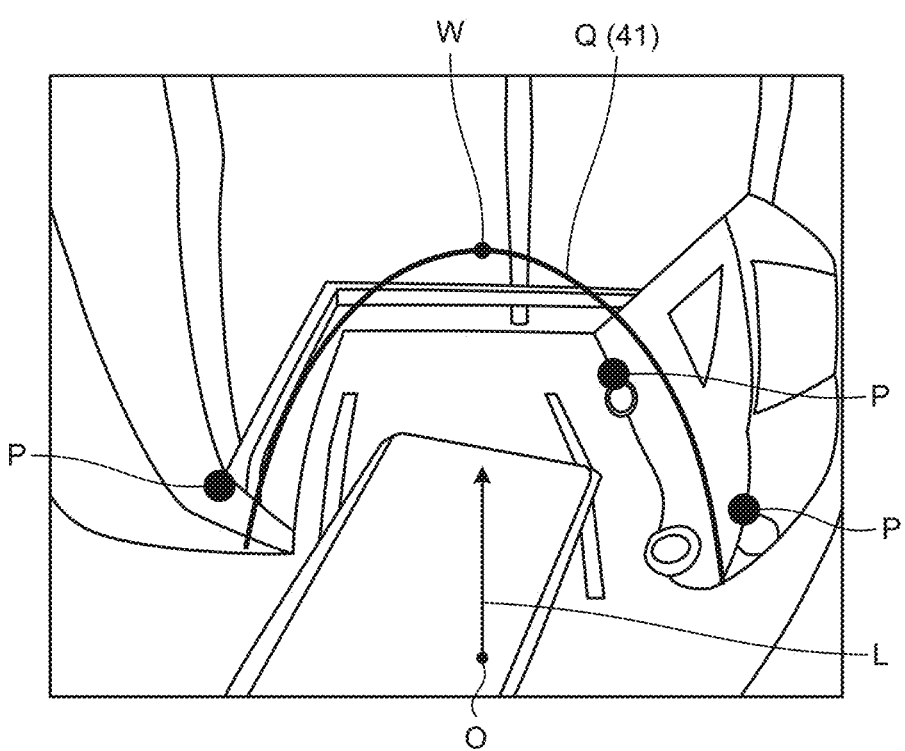
FIG. 14 is an explanatory diagram of an asymptotic curve generated by a determination module.

FIG. 14 is an explanatory diagram of an asymptotic curve Q generated by the determination module 30. Here, the asymptotic curve is an asymptotic curve of a plurality of detection points P in the environmental map information 26A. FIG. 14 illustrates an example in which an asymptotic curve Q is illustrated in a projection image obtained by projecting a captured image on a projection surface in a case where the moving body 2 is overlooked from above. For example, it is assumed that the determination module 30 specifies three detection points P in order of proximity to the self-position S of the moving body 2. In this case, the determination module 30 generates the asymptotic curves Q of these three detection points P.

The determination module 30 outputs the self-position and asymptotic curve information to the virtual viewpoint line-of-sight determination module 34.

The deformation module 32 deforms the projection surface on the basis of the projection shape information determined using the environmental map information including the integrated point cloud information received from the determination module 30. The deformation module 32 is an example of the deformation module.

Figure 15:
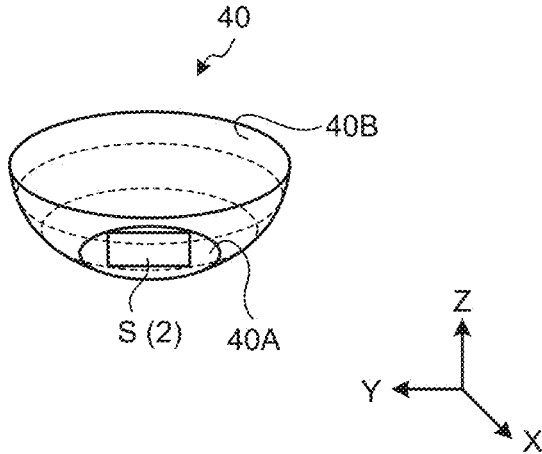
FIG. 15 is a schematic diagram illustrating an example of a reference projection surface.
Figure 16:
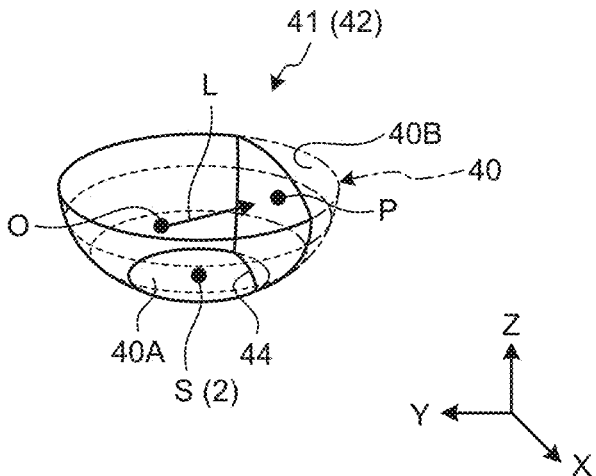
FIG. 16 is a schematic diagram illustrating an example of a projection shape determined by the determination module.

FIG. 15 is a schematic diagram illustrating an example of a reference projection surface 40. FIG. 16 is a schematic diagram illustrating an example of a projection shape 41 determined by the determination module 30. That is, the deformation module 32 deforms a reference projection surface illustrated in FIG. 15 stored in advance on the basis of the projection shape information, and determines a deformed projection surface 42 as the projection shape 41 illustrated in FIG. 16. The deformation module 32 generates deformed projection surface information on the basis of the projection shape 41. This deformation of the reference projection surface is executed with, for example, the detection point P closest to the moving body 2 as a reference. The deformation module 32 outputs the deformed projection surface information to the projection conversion module 36.

Furthermore, for example, the deformation module 32 deforms the reference projection surface to a shape along the asymptotic curve of a predetermined number of the plurality of detection points P in order of proximity to the moving body 2 on the basis of the projection shape information.

The virtual viewpoint line-of-sight determination module 34 determines virtual viewpoint line-of-sight information on the basis of the self-position and the asymptotic curve information.

Determination of the virtual viewpoint line-of-sight information will be described with reference to FIGS. 14 and 16. For example, the virtual viewpoint line-of-sight determination module 34 determines, as a line-of-sight direction L, a direction that passes through the detection point P closest to the self-position S of the moving body 2 and is perpendicular to the deformed projection surface. Furthermore, for example, the virtual viewpoint line-of-sight determination module 34 fixes the direction of the line-of-sight direction L, and determines the coordinates of a virtual viewpoint O as an arbitrary Z coordinate and arbitrary XY coordinates in a direction away from the asymptotic curve Q toward the self-position S. In this case, the XY coordinates may be coordinates at a position farther from the asymptotic curve Q than the self-position S. Then, the virtual viewpoint line-of-sight determination module 34 outputs the virtual viewpoint line-of-sight information indicating the virtual viewpoint O and the line-of-sight direction L to the projection conversion module 36. Note that, as illustrated in FIG. 16, the line-of-sight direction L may be a direction from the virtual viewpoint O toward the position of a vertex W of the asymptotic curve Q.

The projection conversion module 36 generates a projection image obtained by projecting the captured image acquired from the imaging unit 12 on the deformed projection surface on the basis of the deformed projection surface information and the virtual viewpoint line-of-sight information. The projection conversion module 36 transforms the generated projection image into a virtual viewpoint image and outputs the virtual viewpoint image to the image combining module 38. Here, the virtual viewpoint image is an image in which the projection image is visually recognized in an arbitrary direction from the virtual viewpoint.

The projection image generation process by the projection conversion module 36 will be described in detail with reference to FIG. 16. The projection conversion module 36 projects the captured image onto the deformed projection surface 42. Then, the projection conversion module 36 generates a virtual viewpoint image (not illustrated) that is an image obtained by visually recognizing the captured image projected on the deformed projection surface 42 in the line-of-sight direction L from an arbitrary virtual viewpoint O. The position of the virtual viewpoint O may be, for example, the latest self-position S of the moving body 2. In this case, a value of the XY coordinates of the virtual viewpoint O may be set as the value of the XY coordinates of the latest self-position S of the moving body 2. Further, a value of the Z coordinate of the virtual viewpoint O (position in the vertical direction) may be set as the value of the Z coordinate of the detection point P closest to the self-position S of the moving body 2. The line-of-sight direction L may be determined on the basis of a predetermined reference, for example.

The line-of-sight direction L may be, for example, a direction from the virtual viewpoint O toward the detection point P closest to the self-position S of the moving body 2. In addition, the line-of-sight direction L may be a direction that passes through the detection point P and is perpendicular to the deformed projection surface 42. The virtual viewpoint line-of-sight information indicating the virtual viewpoint O and the line-of-sight direction L is created by the virtual viewpoint line-of-sight determination module 34.

For example, the virtual viewpoint line-of-sight determination module 34 may determine, as a line-of-sight direction L, a direction that passes through the detection point P closest to the self-position S of the moving body 2 and is perpendicular to the deformed projection surface 42. Furthermore, the virtual viewpoint line-of-sight determination module 34 may fix the direction of the line-of-sight direction L, and determine the coordinates of the virtual viewpoint O as an arbitrary Z coordinate and arbitrary XY coordinates in a direction away from the asymptotic curve Q toward the self-position S. In this case, the XY coordinates may be coordinates at a position farther from the asymptotic curve Q than the self-position S. Then, the virtual viewpoint line-of-sight determination module 34 outputs the virtual viewpoint line-of-sight information indicating the virtual viewpoint O and the line-of-sight direction L to the projection conversion module 36. Note that, as illustrated in FIG. 16, the line-of-sight direction L may be a direction from the virtual viewpoint O toward the position of a vertex W of the asymptotic curve Q.

The projection conversion module 36 receives the virtual viewpoint line-of-sight information from the virtual viewpoint line-of-sight determination module 34. The projection conversion module 36 receives the virtual viewpoint line-of-sight information to specify the virtual viewpoint O and the line-of-sight direction L. Then, the projection conversion module 36 generates a virtual viewpoint image that is an image obtained by visually recognizing the captured image projected on the deformed projection surface 42 in the line-of-sight direction L from the virtual viewpoint O. The projection conversion module 36 outputs the virtual viewpoint image to the image combining module 38.

The image combining module 38 generates a combined image obtained by extracting a part or all of the virtual viewpoint image. For example, the image combining module 38 performs a process of combining a plurality of virtual viewpoint images (here, four sheets of virtual viewpoint images corresponding to the imaging units 12A to 12D) in a boundary region between the imaging units.

The image combining module 38 outputs the generated combined image to the display unit 16. Note that the combined image may be a bird's-eye view image in which the upper side of the moving body 2 is the virtual viewpoint O, or may be a bird's-eye view image in which the inside of the moving body 2 is the virtual viewpoint O and the moving body 2 is displayed semi-transparently.

Note that the projection conversion module 36 and the image combining module 38 constitute an image generation module 37. The image generation module 37 is an example of an image generation module.

Configuration Example of Determination Module
30

Next, an example of a detailed configuration of the determination module 30 illustrated in FIG. 3 will be described.

Figure 17:
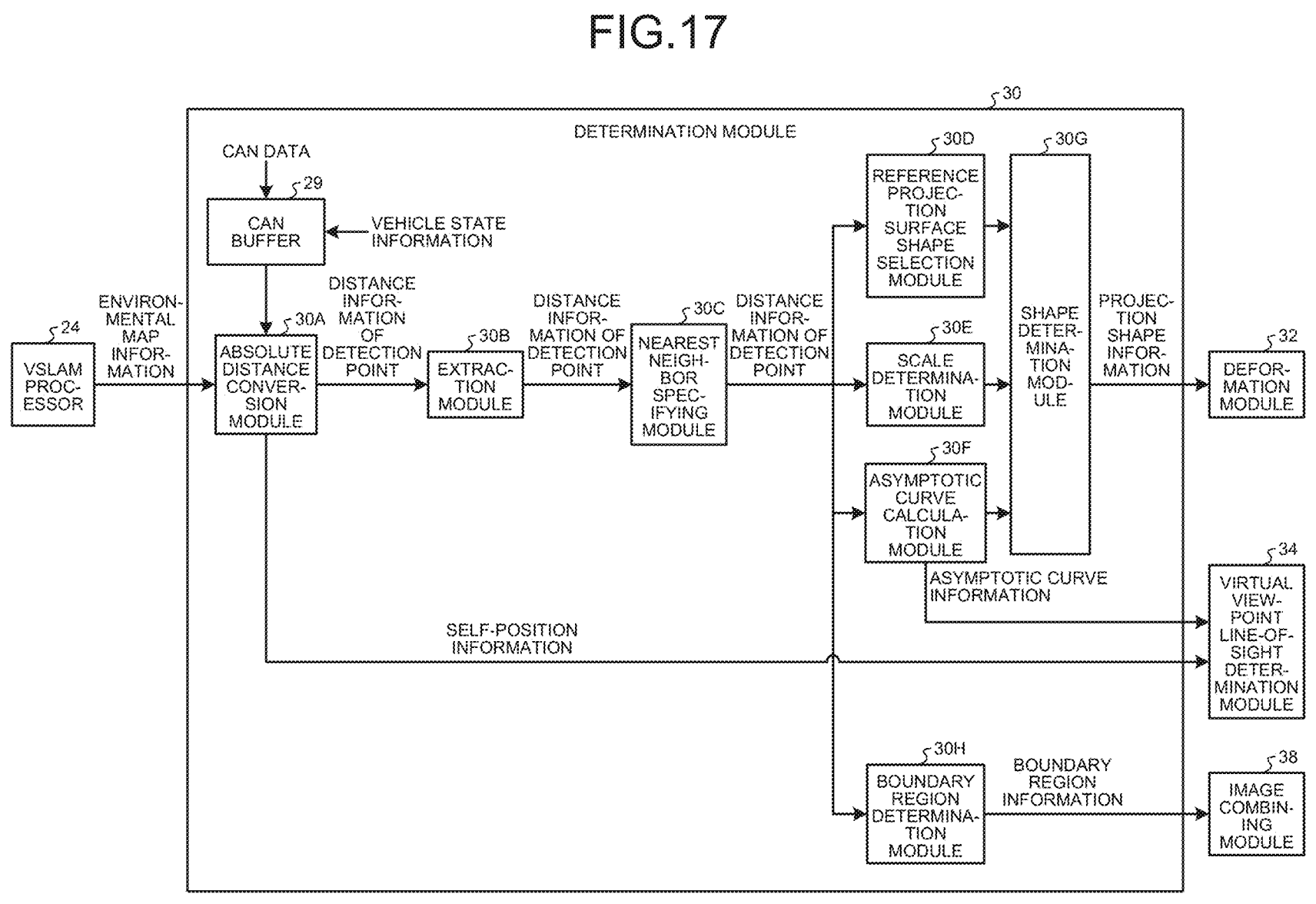

FIG. 17 is a schematic diagram illustrating an example of a functional configuration of the determination module 30. As illustrated in FIG. 17, the determination module 30 includes a CAN buffer 29, an absolute distance conversion module 30A, an extraction module 30B, a nearest neighbor specifying module 30C, a reference projection surface shape selection module 30D, a scale determination module 30E, an asymptotic curve calculation module 30F, a shape determination module 30G, and a boundary region determination module 30H.

The CAN buffer 29 buffers the vehicle state information included in the CAN data transmitted from the ECU 3, and transmits the buffered vehicle state information to the absolute distance conversion module 30A after the thinning process. Note that the vehicle state information buffered by the CAN buffer 29 and the image data buffered by the image buffer 23 can be associated with each other by time information.

The absolute distance conversion module 30A converts the relative positional relationship between the self-position and the surrounding three-dimensional object, which can be known from the environmental map information, into an absolute value of the distance from the self-position to the surrounding three-dimensional object.

Specifically, for example, the speed data of the moving body 2 included in the vehicle state information transmitted from the CAN buffer 29 is used. For example, in the case of the environmental map information 26A illustrated in FIG. 5, the relative positional relationship between the self-position S and the plurality of detection points P can be known, but the absolute value of the distance is not calculated. Here, the distance between a self-position S3 and a self-position S2 can be obtained from the inter-frame period in which the self-position calculation is performed and the speed data between the inter-frame period based on the vehicle state information. Since the relative positional relationship of the environmental map information 26A is similar to that of the real space, the absolute value of the distance from the self-position S to all the other detection points P can also be obtained by knowing the distance between the self-position S3 and the self-position S2. When the detection unit 14 acquires the distance information of the detection point P, the absolute distance conversion module 30A may be omitted.

Then, the absolute distance conversion module 30A outputs the calculated measurement distance of each of the plurality of detection points P to the extraction module 30B. Furthermore, the absolute distance conversion module 30A outputs the calculated current position of the moving body 2 to the virtual viewpoint line-of-sight determination module 34 as self-position information of the moving body 2.

The extraction module 30B extracts a detection point P present within a specific range among the plurality of detection points P having received the measurement distance from the absolute distance conversion module 30A. The specific range is, for example, a range from a road surface on which the moving body 2 is disposed to a height corresponding to the vehicle height of the moving body 2. The range is not limited to this range.

When the extraction module 30B extracts the detection point P within the range, for example, it is possible to extract the detection point P of an object that hinders the progress of the moving body 2 or an object located adjacent to the moving body 2, and the like.

Then, the extraction module 30B outputs the measurement distance of each of the extracted detection points P to the nearest neighbor specifying module 30C.

The nearest neighbor specifying module 300 divides the surroundings of the self-position S of the moving body 2 for each specific range (for example, angular range), and specifies the detection point P closest to the moving body 2 or the plurality of detection points P in order of proximity to the moving body 2 for each range. The nearest neighbor specifying module 30C specifies the detection point P using the measurement distance received from the extraction module 30B. In the present embodiment, a case where the nearest neighbor specifying module 30C specifies a plurality of detection points P in order of proximity to the moving body 2 for each range will be described as an example.

The nearest neighbor specifying module 30C outputs the measurement distance of the detection point P specified for each range to the reference projection surface shape selection module 30D, the scale determination module 30E, the asymptotic curve calculation module 30F, and the boundary region determination module 30H.

The reference projection surface shape selection module 30D selects the shape of the reference projection surface.

Here, the reference projection surface will be described with reference to FIG. 15. The reference projection surface 40 is, for example, a projection surface having a shape serving as a reference when the shape of the projection surface is changed. The shape of the reference projection surface 40 is, for example, a bowl shape, a cylindrical shape, or the like. Note that FIG. 15 illustrates a bowl-shaped reference projection surface 40.

The bowl shape has a bottom surface 40A and a side wall surface 40B, and one end of the side wall surface 40B is continuous with the bottom surface 40A and the other end is opened. The width of the horizontal cross section of the side wall surface 40B increases from the bottom surface 40A side toward the opening side of the other end portion. The bottom surface 40A has, for example, a circular shape. Here, the circular shape is a shape including a perfect circular shape and a circular shape other than the perfect circular shape such as an elliptical shape. The horizontal cross section is an orthogonal plane orthogonal to the vertical direction (arrow Z direction). The orthogonal plane is a two-dimensional plane along an arrow X direction orthogonal to the arrow Z direction and an arrow Y direction orthogonal to the arrow Z direction and the arrow X direction. Hereinafter, the horizontal cross section and the orthogonal plane may be referred to as an XY plane. Note that the bottom surface 40A may have a shape other than a circular shape such as an egg shape.

The cylindrical shape is a shape including a circular-shaped bottom surface 40A and a side wall surface 40B continuous with the bottom surface 40A. In addition, the side wall surface 40B constituting the cylindrical-shaped reference projection surface 40 has a cylindrical shape in which an opening at one end portion is continuous to the bottom surface 40A and the other end portion is opened. However, the side wall surface 40B constituting the cylindrical-shaped reference projection surface 40 has a shape in which the diameter of the XY plane is substantially constant from the bottom surface 40A side toward the opening side of the other end portion. Note that the bottom surface 40A may have a shape other than a circular shape such as an egg shape.

In the present embodiment, a case where the shape of the reference projection surface 40 is a bowl-shape illustrated in FIG. 15 will be described as an example. The reference projection surface 40 is a stereoscopic model virtually formed in a virtual space in which the bottom surface 40A is a surface substantially coinciding with the road surface below the moving body 2 and the center of the bottom surface 40A is the self-position S of the moving body 2.

The reference projection surface shape selection module 30D selects the shape of the reference projection surface 40 by reading one specific shape from the plurality of types of reference projection surfaces 40. For example, the reference projection surface shape selection module 30D selects the shape of the reference projection surface 40 according to the positional relationship between the self-position and the surrounding three-dimensional object, the stabilization distance, and the like. Note that the shape of the reference projection surface 40 may be selected by an operation instruction of the user. The reference projection surface shape selection module 30D outputs the determined shape information of the reference projection surface 40 to the shape determination module 30G. In the present embodiment, as described above, a case where the reference projection surface shape selection module 30D selects the bowl-shaped reference projection surface 40 will be described as an example.

The scale determination module 30E determines the scale of the reference projection surface 40 having the shape selected by the reference projection surface shape selection module 30D. For example, in a case where there is a plurality of detection points P in a range of a predetermined distance from the self-position S, the scale determination module 30E determines to reduce the scale. The scale determination module 30E outputs scale information of the determined scale to the shape determination module 30G.

The asymptotic curve calculation module 30F outputs the asymptotic curve information of the calculated asymptotic curve Q to the shape determination module 30G and the virtual viewpoint line-of-sight determination module 34 using each of the stabilization distances of the detection point P closest to the self-position S for each range from the self-position S received from the nearest neighbor specifying module 30C. Note that the asymptotic curve calculation module 30F may calculate the asymptotic curve Q of the detection point P accumulated for each of the plurality of portions of the reference projection surface 40. Then, the asymptotic curve calculation module 30F may output the asymptotic curve information of the calculated asymptotic curve Q to the shape determination module 30G and the virtual viewpoint line-of-sight determination module 34.

The shape determination module 30G enlarges or reduces the reference projection surface 40 having the shape indicated by the shape information received from the reference projection surface shape selection module 30D to the scale of the scale information received from the scale determination module 30E. Then, the shape determination module 30G determines, as the projection shape, a shape obtained by deforming the enlarged or reduced reference projection surface 40 so as to have a shape along the asymptotic curve information of the asymptotic curve Q received from the asymptotic curve calculation module 30F.

Here, the determination of the projection shape will be described in detail with reference to FIG. 16. As illustrated in FIG. 16, the shape determination module 30G determines, as the projection shape 41, a shape obtained by deforming the reference projection surface 40 into a shape passing through the detection point P closest to the self-position S of the moving body 2, which is the center of the bottom surface 40A of the reference projection surface 40. The shape passing through the detection point P means that the side wall surface 40B after deformation has a shape passing through the detection point P. The self-position S is the latest self-position S calculated by the self-position estimation module 27.

That is, the shape determination module 30G specifies the detection point P closest to the self-position S among the plurality of detection points P registered in the environmental map information 26A. Specifically, the XY coordinates of the center position (self-position S) of the moving body 2 is set as $(X, Y)=(0, 0)$. Then, the shape determination module 30G specifies the detection point P at which the value of $X^2+Y^2$ indicates the minimum value as the detection point P closest to the self-position S. Then, the shape determination module 30G determines, as the projection shape 41, a shape obtained by deforming the side wall surface 40B of the reference projection surface 40 so as to have a shape passing through the detection point P.

More specifically, the shape determination module 30G determines the deformed shape of a partial region of the bottom surface 40A and a partial region of the side wall surface 40B as the projection shape 41 so that the partial region of the side wall surface 40B becomes a wall surface passing through the detection point P closest to the moving body 2 when the reference projection surface 40 is deformed. The deformed projection shape 41 is, for example, a shape rising from a rising line 44 on the bottom surface 40A toward a direction approaching the center of the bottom surface 40A at the viewpoint of the XY plane (in plan view). Rising means, for example, bending or folding a part of the side wall surface 40B and the bottom surface 40A toward a direction approaching the center of the bottom surface 40A so that an angle formed by the side wall surface 40B and the bottom surface 40A of the reference projection surface 40 becomes a smaller angle. In the raised shape, the rising line 44 may be located between the bottom surface 40A and the side wall surface 40B, and the bottom surface 40A may remain un-deformed.

The shape determination module 30G determines a specific region on the reference projection surface 40 to be deformed so as to protrude to a position passing through the detection point P at a viewpoint (plan view) of the XY plane. The shape and range of the specific region may be determined on the basis of a predetermined standard. Then, the shape determination module 30G determines the shape of the deformed reference projection surface 40 such that the distance from the self-position S is continuously increased from the protruding specific region toward the region other than the specific region on the side wall surface 40B.

For example, as illustrated in FIG. 16, it is preferable to determine the projection shape 41 such that the shape of the outer periphery of the cross section along the XY plane is a curved shape. Note that the shape of the outer periphery of the cross section of the projection shape 41 is, for example, a circular shape, but may be a shape other than the circular shape.

Note that the shape determination module 30G may determine a shape obtained by deforming the reference projection surface 40 so as to have a shape along the asymptotic curve as the projection shape 41. The shape determination module 30G generates an asymptotic curve of a predetermined number of the plurality of detection points P in a direction away from the detection point P closest to the self-position S of the moving body 2. The number of detection points P needs only to be plural. For example, the number of detection points P is preferably three or more. In this case, the shape determination module 30G preferably generates an asymptotic curve of a plurality of detection points P at positions separated by a predetermined angle or more as viewed from the self-position S. For example, the shape determination module 30G can determine, as the projection shape 41, a shape obtained by deforming the reference projection surface 40 so as to have a shape along the generated asymptotic curve Q in the asymptotic curve Q illustrated in FIG. 14.

The shape determination module 30G may divide the surroundings of the self-position S of the moving body 2 for each specific range, and specify the detection point P closest to the moving body 2 or the plurality of detection points P in order of proximity to the moving body 2 for each range. Then, the shape determination module 30G may determine, as the projection shape 41, a shape obtained by deforming the reference projection surface 40 so as to have a shape passing through the detection points P specified for each range or a shape along the asymptotic curve Q of the plurality of specified detection points P.

Then, the shape determination module 30G outputs the projection shape information of the determined projection shape 41 to the deformation module 32.

Next, an example of a procedure of information processing including the buffering VSLAM process executed by the information processing device 10 according to the present embodiment will be described.

Figure 18:
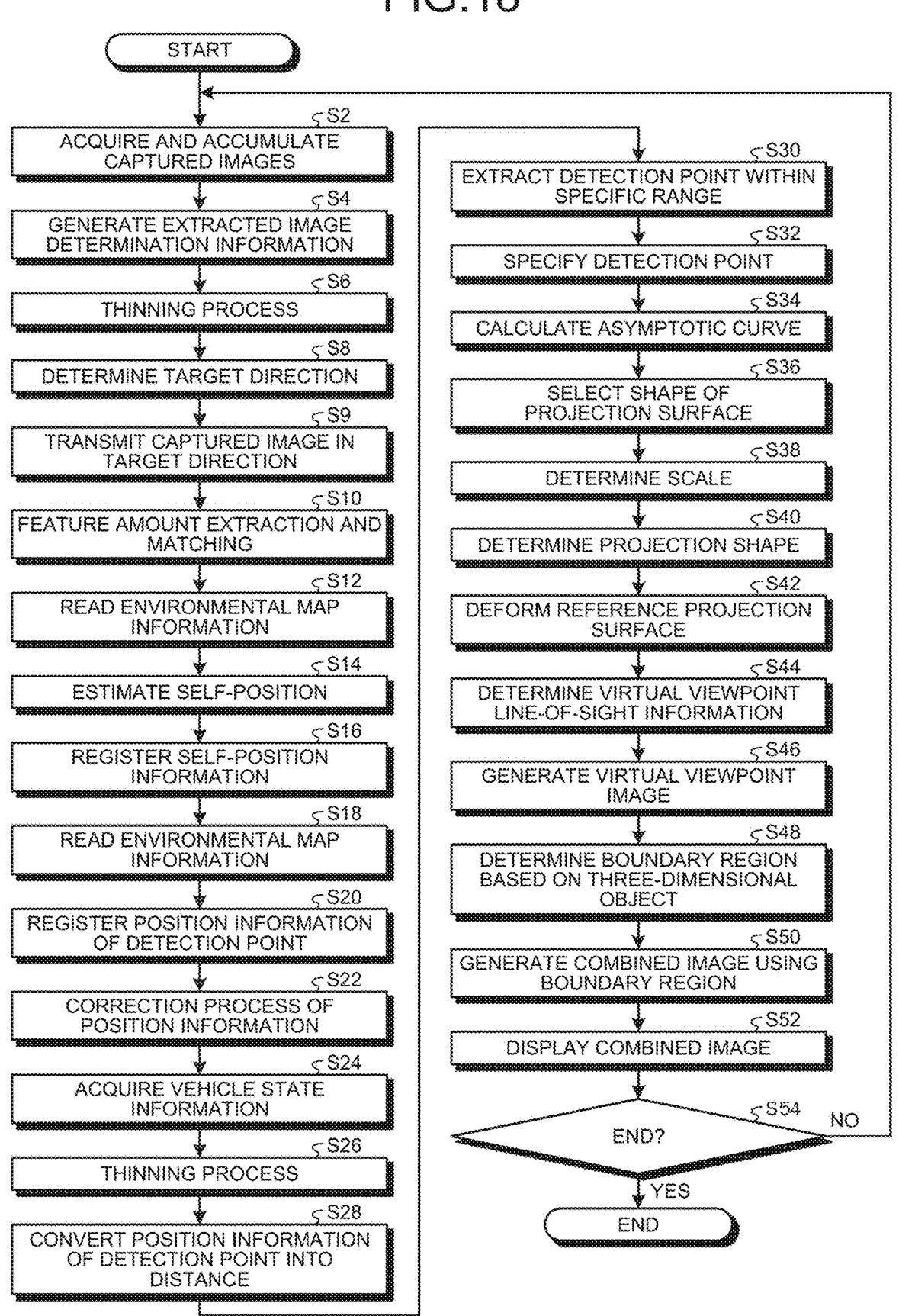
FIG. 18 is a flowchart illustrating an example of a procedure of information processing executed by the information processing device.

FIG. 18 is a flowchart illustrating an example of a procedure of information processing executed by the information processing device 10.

The first accumulation module 230a and the second accumulation module 230b of the image buffer 23 acquire and accumulate the left captured images from the left imaging unit 12B and the right captured images from the right imaging unit 12C via the acquisition module 20 (Step S2). The image buffer 23 generates the extracted image determination information on the basis of the vehicle state information included in the CAN data received from the ECU 3, the instruction information by a passenger of the moving body 2, the information identified by the surrounding object detection sensor mounted on the moving body 2, the information in which a specific image is recognized, and the like (Step S4).

The first thinning module 231a and the second thinning module 231b of the image buffer 23 execute a thinning process at a frame rate based on the extracted image determination information (Step S6).

The transmission module 232 determines the target direction on the basis of the extracted image determination information (Step S8).

The transmission module 232 transmits the captured image corresponding to the determined target direction (for example, the left captured image) to the matching module 25 (Step S9).

The matching module 25 performs feature amount extraction and matching process by using a plurality of captured images captured at different imaging timings selected in Step S12 and captured by the imaging unit 12 among the captured images acquired in Step S10 (Step S10). In addition, the matching module 25 registers, in the storage unit 26, information of corresponding points between the plurality of captured images captured at different imaging timings, the information being specified by the matching process.

The self-position estimation module 27 reads the matching points and the environmental map information 26A (the surrounding position information and the self-position information) from the storage unit 26 (Step S12). The self-position estimation module 27 estimates a relative self-position with respect to the captured image by projective transformation or the like using the plurality of matching points acquired from the matching module 25 (Step S14), and registers the calculated self-position information in the environmental map information 26A (Step S16).

A three-dimensional restoration module 27B reads the environmental map information 26A (the surrounding position information and the self-position information) (Step S18). The three-dimensional restoration module 27B performs the perspective projection transformation processing using a moving amount (a translation amount and a rotation amount) of the self-position estimated by the self-position estimation module 27, and determines the three-dimensional coordinates (relative coordinates with respect to the self-position) of the matching points, and registers the three-dimensional coordinates to the environmental map information 26A as the surrounding position information (Step S20).

The correction module 28 reads the environmental map information 26A (the surrounding position information and the self-position information). The correction module 28 corrects the surrounding position information and the self-position information registered in the environmental map information 26A using, for example, the least squares method or the like so that the sum of the differences in distance in the three-dimensional space is minimized between the three-dimensional coordinates calculated in the past and the newly calculated three-dimensional coordinates for a point matched a plurality of times between a plurality of frames (Step S22), and updates the environmental map information 26A.

The absolute distance conversion module 30A acquires the vehicle state information from the CAN buffer 29 (Step S24), and executes a thinning process of the vehicle state information to correspond to a thinning process of the first thinning module 231a or the second thinning module 231b (Step S26).

The absolute distance conversion module 30A fetches speed data (speed of own vehicle) of the moving body 2 included in the CAN data received from the ECU 3 of the moving body 2. Using the speed data of the moving body 2, the absolute distance conversion module 30A converts the surrounding position information included in the environmental map information 26A into distance information from the current position, which is the latest self-position S of the moving body 2, to each of the plurality of detection points P (Step S28). The absolute distance conversion module 30A outputs the calculated distance information of each of the plurality of detection points P to the extraction module 30B. Furthermore, the absolute distance conversion module 30A outputs the calculated current position of the moving body 2 to the virtual viewpoint line-of-sight determination module 34 as self-position information of the moving body 2.

The extraction module 30B extracts a detection point P present within a specific range among the plurality of detection points P having received the distance information (Step S30).

The nearest neighbor specifying module 30C divides the surroundings of the self-position S of the moving body 2 for each specific range, specifies the detection point P closest to the moving body 2 or the plurality of detection points P in order of proximity to the moving body 2 for each range, and extracts the distance to the nearest neighbor object (Step S32). The nearest neighbor specifying module 30C outputs the measurement distance d of the detection point P (measurement distance between the moving body 2 and the nearest neighbor object) specified for each range to the reference projection surface shape selection module 30D, the scale determination module 30E, the asymptotic curve calculation module 30F, and the boundary region determination module 30H.

The asymptotic curve calculation module 30F calculates an asymptotic curve (Step S34), and outputs the asymptotic curve to the shape determination module 30G and the virtual viewpoint line-of-sight determination module 34 as asymptotic curve information.

The reference projection surface shape selection module 30D selects the shape of the reference projection surface 40 (Step S36), and outputs selected shape information of the reference projection surface 40 to the shape determination module 30G.

The scale determination module 30E determines a scale of the reference projection surface 40 having the shape selected by the reference projection surface shape selection module 30D (Step S38), and outputs scale information of the determined scale to the shape determination module 30G.

The shape determination module 30G determines the projection shape as to how to deform the shape of the reference projection surface on the basis of the scale information and the asymptotic curve information (Step S40). The shape determination module 30G outputs projection shape information of the determined projection shape 41 to the deformation module 32.

The deformation module 32 deforms the shape of the reference projection surface on the basis of the projection shape information (Step S42). The deformation module 32 outputs the deformed projection surface information to the projection conversion module 36.

The virtual viewpoint line-of-sight determination module 34 determines virtual viewpoint line-of-sight information on the basis of the self-position and the asymptotic curve information (Step S44). The virtual viewpoint line-of-sight determination module 34 outputs the virtual viewpoint line-of-sight information indicating the virtual viewpoint O and the line-of-sight direction L to the projection conversion module 36.

The projection conversion module 36 generates a projection image obtained by projecting the captured image acquired from the imaging unit 12 on the deformed projection surface on the basis of the deformed projection surface information and the virtual viewpoint line-of-sight information. The projection conversion module 36 transforms the generated projection image into a virtual viewpoint image (Step S46) and outputs the virtual viewpoint image to the image combining module 38.

The boundary region determination module 30H determines the boundary region based on the distance to the nearest neighbor object specified for each range. That is, the boundary region determination module 30H determines a boundary region as an overlapping region of the spatially adjacent surrounding images on the basis of the position of the nearest neighbor object of the moving body 2 (Step S48). The boundary region determination module 30H outputs the determined boundary region to the image combining module 38.

The image combining module 38 combines the spatially adjacent perspective projection images using the boundary region to generate a combined image (Step S50). That is, the image combining module 38 generates a combined image by combining the perspective projection images in four directions according to the boundary region set to the angle in the nearest neighbor object direction. In the boundary region, spatially adjacent perspective projection images are blended at a predetermined ratio.

The display unit 16 displays the combined image (Step S52).

The information processing device 10 determines whether or not to end the information processing (Step S54). For example, the information processing device 10 determines whether or not a signal indicating a position movement stop of the moving body 2 is received from the ECU 3, thereby making the determination in Step S54. Furthermore, for example, the information processing device 10 may perform the determination of Step S54 by determining whether or not an instruction to end the information processing has been received by an operation instruction or the like by the user.

When a negative determination is made in Step S54 (Step S54: No), the processes from Step S2 to Step S54 described above are repeatedly executed.

On the other hand, when an affirmative determination is made in Step S54 (Step S54: Yes), this routine is ended.

When the process returns from Step S54 to Step S2 after the correction process of Step S22 is executed, the subsequent correction process of Step S22 may be omitted. In addition, when the process returns from Step S54 to Step S2 without performing the correction process of Step S22, the subsequent correction process of Step S22 may be executed.

As described above, the information processing device 10 according to the embodiment includes the image buffer 23 as a buffering unit and the VSLAM processor 24 as a VSLAM processor. The image buffer 23 buffers image data of the surroundings of the moving body obtained by the imaging unit 12. The image buffer 23 transmits extracted image data among the buffered images. The VSLAM processor 24 executes the VSLAM process using the image data transmitted.

Therefore, the VSLAM processor 24 can complete the VSLAM process before the start of the backward movement, using the captured image including a large amount of three-dimensional information of the surroundings of the parking space in the period from the generation timing of the trigger information to the start of the backward movement, for example. As a result, for example, in a case where a vehicle is parked with a turn-back operation, it is possible to increase, as compared with the related art, information on an object (for example, car1, car2, and the like illustrated in FIGS. 6 to 8) in the vicinity of a parking position which is to be framed in last and be framed out first. Furthermore, even in a case where there are few objects in the vicinity of the parking position, since the captured image obtained by capturing the range in front of the parking space is used, the information on the three-dimensional object can be increased as compared with the related art. Furthermore, even in a case where the moving body 2 moves at a constant speed or more, the buffered image can be used at a desired frame rate, and thus the information of the three-dimensional object can be substantially increased as compared with the related art. As a result, it is possible to solve the shortage of the position information of the surrounding objects obtained by the VSLAM process, and it is possible to stabilize the detection of the position of the surrounding objects and the self-position by the VSLAM.

The image buffer 23 transmits image data obtained in the target period including the first period before and after the generation time of the trigger information and the second period after the lapse of the first period until the moving body 2 stops. Therefore, the VSLAM process can be continued using the buffered image even in a period until the moving body 2 decelerates and stops and a period in which the gear of the moving body 2 is switched from the drive "D" to the reverse "R".

The image buffer 23 transmits the extracted image data. Therefore, for a section in which the moving body 2 moves at a constant speed or more, for example, the VSLAM process can be executed using temporally adjacent captured images at a relatively high frame rate. As a result, the information on the three-dimensional object can be substantially increased as compared with the related art.

The image buffer 23 buffers at least a left captured image obtained by imaging a first direction (left direction) and a right captured image obtained by imaging a second direction (right direction) different from the first direction. The image buffer 23 transmits the left captured image or the right captured image on the basis of the extracted image determination information including the operation status such as the speed and the turning angle of the moving body, the instruction information by the passenger of the moving body, the information identified by the surrounding object detection sensor mounted on the moving body, the information in which the specific image is recognized, and the like.

Therefore, the VSLAM processor 24 can execute the VSLAM process using only the left captured image including a large amount of information on the three-dimensional object in the vicinity of the parking space PA among the left captured image and the right captured image. As a result, the processing load can be greatly reduced as compared with the VSLAM process using both the left captured image and the right captured image.

First Modification

The captured image to be subjected to the buffering VSLAM process, that is, how far the position in front from the parking space PA the captured image taken at is to be subjected to the VSLAM process can be arbitrarily adjusted by the length of the first period going back from the generation time of the trigger information. For example, in a case where the first period going back from the generation time of the trigger information is set to be long, the VSLAM process can be executed using many pieces of three-dimensional object information in front of the parking space PA as viewed from the moving body 2. In addition, the first period can be set to zero as necessary. Further, it is also possible to execute the buffering VSLAM process after a delay of a third period from the generation time of the trigger information.

Second Modification

In the above embodiment, the buffering VSLAM process is started with the fact as the trigger information that the moving speed of the moving body 2 becomes equal to or less than the threshold and the fact that the steering wheel is rotated by a certain amount or more for turning. On the other hand, for example, the buffering VSLAM process may be started with an input instruction from the user as a trigger. Such an example in which an input instruction from a user is used as a trigger can be used, for example, in a case where automatic parking is performed. Furthermore, as the trigger information, an operation status such as a speed of the moving body 2, information identified by a surrounding object detection sensor mounted on the moving body 2, information in which a specific image is recognized, or the like may be used.

Third Modification

In the above embodiment, the target direction used for the buffering VSLAM process is determined to be leftward from the vehicle state information including the fact that the moving speed of the moving body 2 becomes equal to or less than the threshold and the fact that the steering wheel (steering) is rotated by a certain amount or more for turning. On the other hand, for example, the target direction used for the buffering VSLAM process may be determined using an input instruction from the user as a trigger. Such an example of determining the target direction by the input instruction from the user can be used, for example, in a case where automatic parking is performed. Furthermore, as the trigger information, an operation status such as a speed of the moving body 2, information identified by a surrounding object detection sensor mounted on the moving body 2, information in which a specific image is recognized, or the like may be used.

Fourth Modification

In the above embodiment, in order to reduce the load of the VSLAM process, the target direction is determined to be leftward based on the vehicle state information, and the buffering VSLAM process is executed using only the left captured image obtained by capturing the left imaging region E2. On the other hand, if the specification does not cause a problem in the load of the VSLAM process, it is also possible to execute the buffering VSLAM process using both the left captured image obtained by imaging the left imaging region E2 and the right captured image obtained by imaging the right imaging region E3.

Fifth Modification

In the above embodiment, the left imaging region E2 and the right imaging region E3 are accumulated in the first accumulation module 230a and the second accumulation module 230b as an example. On the other hand, the first accumulation module 230a, the second accumulation module 230b, or a new accumulation module may be provided, and an image captured by the front imaging unit 12A or the rear imaging unit 12D may be input and stored. Furthermore, in a case where the moving body 2 is a drone, an upper captured image acquired by the imaging unit provided on the upper surface of the moving body 2 or a lower captured image acquired by the imaging unit provided on the lower surface of the moving body 2 can be accumulated, and the buffering VSLAM process can be executed using the accumulated images.

Sixth Modification

In the above embodiment, an example of using the buffering VSLAM process in a case where the moving body 2 parks in reverse has been described. On the other hand, the buffering VSLAM process may be used in a case where the moving body 2 is parked head-in.

According to such a configuration, the buffering VSLAM process and the normal VSLAM process complement each other. As a result, the lack of detection information can be further resolved, and a highly reliable surrounding map can be generated.

Seventh Modification

In the above embodiment, the case where the image buffer 23 buffers all the images at 30 fps from the imaging unit and then performs the thinning process has been described as an example. On the other hand, the image buffer 23 may capture images in the first accumulation module 230a and the second accumulation module 230b while performing thinning at the maximum frame rate used in the VSLAM process (for example, 5 fps), and the first thinning module 231a and the second thinning module 231b may perform thinning process from the first accumulation module 230a and the second accumulation module 230b for the VSLAM process section with a lower rate.

Although the embodiments and the modifications have been described above, the information processing device, the information processing method, and the computer program product disclosed in the present application are not limited to the above-described embodiments and the like as they are, and the components can be modified and embodied in each implementation stage and the like without departing from the gist thereof. In addition, various inventions can be formed by an appropriate combination of a plurality of constituent elements disclosed in the above embodiments and modifications. For example, some components may be deleted from all the components shown in the embodiments.

Note that the information processing device 10 of the above embodiment and modifications can be applied to various apparatuses. For example, the information processing device 10 of the above-described embodiment and each modification can be applied to a monitoring camera system that processes an image obtained from a monitoring camera, an in-vehicle system that processes an image of a surrounding environment outside a vehicle, or the like.

According to one aspect of the information processing device disclosed in the present application, it is possible to solve the shortage of the position information of the surrounding objects obtained by the VSLAM process.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing device comprising:
a buffer configured to buffer image data of surroundings of a moving body obtained by an imaging unit of the moving body, execute a thinning process of the buffered image data at different intervals according to extracted image determination information to extract image data, and transmit the extracted image data in a time-series sequence; and
a VSLAM processor configured to execute a VSLAM process by using the extracted image data.

2. The information processing device according to claim 1, wherein
the extracted image determination information includes information determined based on at least one of information on a state of movement of the moving body, instruction information by a passenger of the moving body, information on a surrounding object of the moving body identified by a surrounding object detection sensor mounted on the moving body, and information on surroundings of the moving body recognized based on the image data obtained by the imaging unit.

3. The information processing device according to claim 1, wherein
the buffer is configured to extract image data of a first period from among the buffered image data as the extracted image data, based on the extracted image determination information.

4. The information processing device according to claim 3, wherein
the buffer is configured to execute a thinning process of the buffered image data based on the extracted image determination information to generate the extracted image data, and
in the thinning process, a time interval of thinning out from the buffered image data is different between the first period and a second period different from the first period.

5. The information processing device according to claim 1, wherein the buffer is configured to:
buffer first image data obtained by imaging a first direction and second image data obtained by imaging a second direction different from the first direction from among the image data of surroundings of the moving body; and
transmit first extracted image data extracted from the first image data and second extracted image data extracted from the second image data, as the extracted image data based on the extracted image determination information.

6. The information processing device according to claim 1, wherein
the buffered image data includes a plurality of frames, and
the extracted image data includes image data obtained by cutting out a partial region of at least one frame of the buffered image data.

7. The information processing device according to claim 1, wherein
the image data of surroundings of the moving body includes image data obtained by a plurality of the imaging units, and
the buffer is configured to buffer, when the moving body makes a change in a traveling direction, the image data of surroundings of the moving body acquired by the imaging units different before and after the change.

8. The information processing device according to claim 7, wherein
the VSLAM processor is configured to perform an integration of:
map information obtained by a VSLAM process based on image data of the surroundings of the moving body before the change in the traveling direction of the moving body; and
map information obtained by a VSLAM process based on image data of the surroundings of the moving body after the change in the traveling direction of the moving body.

9. An information processing method executed by a computer, the method comprising:
buffering image data of surroundings of a moving body obtained by an imaging unit of the moving body;
executing a thinning process of the buffered image data at different intervals according to extracted image determination information to extract image data;
transmitting extracted image data in a time-series sequence; and
executing a VSLAM process by using the extracted image data.

10. A computer program product including programmed instructions embodied in and stored on a non-transitory computer readable medium, the instructions, when executed by a computer causing the computer to perform:
buffering image data of surroundings of a moving body obtained by an imaging unit of the moving body;
executing a thinning process of the buffered image data at different intervals according to extracted image determination information to extract image data;
transmitting extracted image data in a time-series sequence; and
executing a VSLAM process by using the extracted image data.

* * * * *